(12) United States Patent
Sani et al.

(10) Patent No.: US 11,141,834 B2
(45) Date of Patent: *Oct. 12, 2021

(54) POLYCRYSTALLINE DIAMOND COMPACTS AND RELATED METHODS

(71) Applicant: US SYNTHETIC CORPORATION, Orem, UT (US)

(72) Inventors: Mohammad N. Sani, Berkshire (GB); Jair J. Gonzalez, Provo, UT (US); Andrew E. Dadson, Provo, UT (US); Debkumar Mukhopadhyay, Sandy, UT (US)

(73) Assignee: US SYNTHETIC CORPORATION, Orem, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/861,294

(22) Filed: Jan. 3, 2018

(65) Prior Publication Data
US 2018/0141185 A1 May 24, 2018

Related U.S. Application Data

(63) Continuation of application No. 14/147,241, filed on Jan. 3, 2014, now Pat. No. 9,889,541, which is a (Continued)

(51) Int. Cl.
*B24D 3/10* (2006.01)
*B22F 3/24* (2006.01)
(Continued)

(52) U.S. Cl.
CPC .................. *B24D 3/10* (2013.01); *B22F 3/24* (2013.01); *B22F 5/00* (2013.01); *B22F 7/06* (2013.01);
(Continued)

(58) Field of Classification Search
CPC ...... B22F 3/24; B22F 5/00; B22F 7/06; C04B 35/528; C04B 35/645; C04B 2235/3817;
(Continued)

(56) References Cited

U.S. PATENT DOCUMENTS 2,947,609 A 8/1960 Strong
4,042,673 A 8/1977 Strong
(Continued)

FOREIGN PATENT DOCUMENTS

CN 1474791 2/2004
CN 2906032 5/2007
(Continued)

OTHER PUBLICATIONS

U.S. Appl. No. 61/109,752, filed Oct. 30, 2008, Sani et al.
(Continued)

*Primary Examiner* — Pegah Parvini
*Assistant Examiner* — Ross J Christie
(74) *Attorney, Agent, or Firm* — Dorsey & Whitney LLP

(57) ABSTRACT

Embodiments of the invention relate to polycrystalline diamond compacts ("PDCs") and methods of fabricating polycrystalline diamond tables and PDCs in a manner that facilitates removal of metal-solvent catalyst used in the manufacture of polycrystalline diamond tables of such PDCs.

22 Claims, 14 Drawing Sheets

Related U.S. Application Data continuation of application No. 12/608,155, filed on Oct. 29, 2009, now Pat. No. 8,663,349.

(60) Provisional application No. 61/109,752, filed on Oct. 30, 2008.

(51) Int. Cl.

| | | |
|---|---|---|
| *B22F 5/00* | (2006.01) | |
| *B22F 7/06* | (2006.01) | |
| *C22C 26/00* | (2006.01) | |
| *C04B 35/645* | (2006.01) | |
| *C04B 35/528* | (2006.01) | |
| *B24D 18/00* | (2006.01) | |

(52) U.S. Cl.
CPC ..... *B24D 18/0009* (2013.01); *B24D 18/0027* (2013.01); *C04B 35/528* (2013.01); *C04B 35/645* (2013.01); *C22C 26/00* (2013.01); *C04B 2235/3817* (2013.01); *C04B 2235/3847* (2013.01); *C04B 2235/427* (2013.01); *C04B 2235/5436* (2013.01); *C04B 2235/5445* (2013.01); *C04B 2235/5472* (2013.01); *Y10T 428/12028* (2015.01); *Y10T 428/12056* (2015.01); *Y10T 428/24355* (2015.01); *Y10T 428/30* (2015.01)

(58) Field of Classification Search
CPC ...... C04B 2235/3847; C04B 2235/427; C04B 2235/5436; C04B 2235/5445; C04B 2235/5472; B24D 3/10; B24D 18/0009; B24D 18/0027; C22C 26/00; Y10T 428/12028; Y10T 428/12056; Y10T 428/24355; Y10T 428/30
See application file for complete search history.

(56) References Cited

U.S. PATENT DOCUMENTS

| | | | |
|---|---|---|---|
| 4,082,185 A | 4/1978 | Strong | |
| 4,224,380 A | 9/1980 | Bovenkerk et al. | |
| 4,268,276 A | 5/1981 | Bovenkerk | |
| 4,274,900 A | 6/1981 | Mueller et al. | |
| 4,301,134 A | 11/1981 | Strong | |
| 4,410,054 A | 10/1983 | Nagel et al. | |
| 4,468,138 A | 8/1984 | Nagel | |
| 4,560,014 A | 12/1985 | Geczy | |
| 4,572,722 A | 2/1986 | Dyer | |
| 4,738,322 A | 4/1988 | Hall et al. | |
| 4,811,801 A | 3/1989 | Salesky et al. | |
| 4,907,377 A | 3/1990 | Csillag et al. | |
| 4,913,247 A | 4/1990 | Jones | |
| 5,009,673 A | 4/1991 | Cho et al. | |
| 5,016,718 A | 5/1991 | Tandberg | |
| 5,022,894 A | 6/1991 | Vagarali et al. | |
| 5,092,687 A | 3/1992 | Hall | |
| 5,120,327 A | 6/1992 | Dennis | |
| 5,135,061 A | 8/1992 | Newton, Jr. | |
| 5,154,245 A | 10/1992 | Waldenström et al. | |
| 5,180,022 A | 1/1993 | Brady | |
| 5,304,342 A | 4/1994 | Hall, Jr. et al. | |
| 5,364,192 A | 11/1994 | Damm et al. | |
| 5,368,398 A | 11/1994 | Damm et al. | |
| 5,370,195 A | 12/1994 | Keshavan et al. | |
| 5,460,233 A | 10/1995 | Meany et al. | |
| 5,480,233 A | 1/1996 | Cunningham | |
| 5,544,713 A | 8/1996 | Dennis | |
| 5,560,754 A | 10/1996 | Johnson et al. | |
| 5,601,477 A | 2/1997 | Bunting et al. | |
| 5,980,982 A | 11/1999 | Degawa et al. | |
| 6,056,911 A | 5/2000 | Griffin | |
| 6,220,375 B1 | 4/2001 | Butcher et al. | |
| 6,344,149 B1 | 2/2002 | Oles | |
| 6,544,308 B2 | 4/2003 | Griffin et al. | |
| 6,601,662 B2 | 8/2003 | Matthias et al. | |
| 6,793,681 B1 | 9/2004 | Pope et al. | |
| 6,846,341 B2 | 1/2005 | Middlemiss | |
| 6,915,866 B2 | 7/2005 | Middlemiss | |
| 7,517,589 B2 | 4/2009 | Eyre | |
| 7,575,805 B2 | 8/2009 | Achilles et al. | |
| 7,681,669 B2 | 3/2010 | Cannon et al. | |
| 7,754,333 B2 | 7/2010 | Eyre et al. | |
| 7,757,792 B2 | 7/2010 | Shamburger | |
| 9,889,541 B2* | 2/2018 | Sani | B24D 3/10 |
| 2002/0034631 A1 | 3/2002 | Griffin et al. | |
| 2002/0034632 A1 | 3/2002 | Griffin et al. | |
| 2002/0037200 A1 | 3/2002 | Boyce | |
| 2002/0043407 A1 | 4/2002 | Belnap et al. | |
| 2004/0140132 A1 | 7/2004 | Middlemiss | |
| 2005/0050801 A1 | 3/2005 | Cho et al. | |
| 2005/0210755 A1* | 9/2005 | Cho | B21C 3/025 51/293 |
| 2006/0060390 A1 | 3/2006 | Eyre | |
| 2006/0157285 A1 | 7/2006 | Cannon | |
| 2006/0180354 A1 | 8/2006 | Belnap et al. | |
| 2006/0191723 A1 | 8/2006 | Keshavan et al. | |
| 2007/0034416 A1 | 2/2007 | Cho et al. | |
| 2007/0079994 A1 | 4/2007 | Middlemiss | |
| 2007/0151769 A1 | 7/2007 | Slutz | |
| 2007/0186483 A1 | 8/2007 | Tank et al. | |
| 2007/0187155 A1 | 8/2007 | Middlemiss | |
| 2008/0073127 A1 | 3/2008 | Zhan et al. | |
| 2008/0115421 A1 | 5/2008 | Sani | |
| 2008/0206576 A1 | 8/2008 | Qian et al. | |
| 2008/0223623 A1 | 9/2008 | Keshavan et al. | |
| 2008/0230280 A1 | 9/2008 | Keshavan et al. | |
| 2009/0090563 A1 | 4/2009 | Voronin et al. | |
| 2009/0152017 A1 | 6/2009 | Shen et al. | |
| 2009/0152018 A1 | 6/2009 | Sani | |
| 2009/0313908 A1 | 12/2009 | Zhang et al. | |
| 2010/0095602 A1 | 4/2010 | Belnap et al. | |
| 2010/0212971 A1 | 8/2010 | Mukhopadhyay et al. | |
| 2011/0017519 A1 | 1/2011 | Bertagnolli et al. | |
| 2011/0023375 A1 | 2/2011 | Sani et al. | |
| 2014/0115971 A1 | 5/2014 | Sani et al. | |

FOREIGN PATENT DOCUMENTS

| | | |
|---|---|---|
| CN | 101275213 | 10/2008 |
| GB | 2423320 | 8/2006 |
| WO | WO 08/053430 | 5/2008 |
| WO | WO 2008/135949 | 11/2008 |
| WO | WO 2010/098978 | 2/2010 |
| WO | WO 2011/059648 | 5/2011 |

OTHER PUBLICATIONS

U.S. Appl. No. 12/185,457, filed Aug. 4, 2008, Vail.
U.S. Appl. No. 12/608,155, filed Oct. 29, 2009, Sani et al.
U.S. Appl. No. 14/147,241, filed Jan. 3, 2014, Sani et al.
Invitation to Pay Additional Fees and Partial Search Report from International Application No. PCT/US2010/053393 dated Feb. 25, 2011.
International Search Report and Written Opinion from International Application No. PCT/US2010/053393 dated Jul. 6, 2011.
U.S. Appl. No. 12/608,155, Apr. 22, 2011, Office Action.
U.S. Appl. No. 12/608,155, Nov. 8, 2011, Office Action.
U.S. Appl. No. 12/608,155, Jan. 11, 2012, Office Action.
U.S. Appl. No. 12/608,155, Oct. 12, 2012, Office Action.
U.S. Appl. No. 12/608,155, Apr. 26, 2013, Office Action.
U.S. Appl. No. 12/608,155, Oct. 8, 2013, Notice of Allowance.
U.S. Appl. No. 12/608,155, Feb. 12, 2014, Issue Notification.
U.S. Appl. No. 14/147,241, Aug. 6, 2015, Office Action.
U.S. Appl. No. 14/147,241, Feb. 19, 2016, Office Action.
U.S. Appl. No. 14/147,241, Jun. 29, 2016, Office Action.
U.S. Appl. No. 14/147,241, Jan. 20, 2017, Office Action.
U.S. Appl. No. 14/147,241, May 4, 2017, Office Action.

(56) References Cited

OTHER PUBLICATIONS

U.S. Appl. No. 14/147,241, Oct. 5, 2017, Notice of Allowance.

* cited by examiner

POLYCRYSTALLINE DIAMOND COMPACTS AND RELATED METHODS

CROSS-REFERENCE TO RELATED APPLICATIONS

This application is a continuation of U.S. application Ser. No. 14/147,241 filed on 3 Jan. 2014, which is a continuation of U.S. application Ser. No. 12/608,155 filed on 29 Oct. 2009, which claims the benefit of U.S. Provisional Application No. 61/109,752 filed on 30 Oct. 2008, the disclosure of each of the foregoing applications is incorporated herein, in its entirety, by this reference.

BACKGROUND

Wear-resistant, superabrasive compacts are utilized in a variety of mechanical applications. For example, polycrystalline diamond compacts ("PDCs") are used in drilling tools (e.g., cutting elements, gage trimmers, etc.), machining equipment, bearing apparatuses, wire-drawing machinery, and in other mechanical apparatuses.

PDCs have found particular utility as superabrasive cutting elements in rotary drill bits, such as roller cone drill bits and fixed cutter drill bits. A PDC cutting element typically includes a superabrasive diamond layer commonly referred to as a diamond table. The diamond table is formed and bonded to a substrate using a high-pressure/high-temperature ("HPHT") process. The PDC cutting element may also be brazed directly into a preformed pocket, socket, or other receptacle formed in a bit body. The substrate may often be brazed or otherwise joined to an attachment member, such as a cylindrical backing. A rotary drill bit typically includes a number of PDC cutting elements affixed to the bit body. It is also known that a stud carrying the PDC may be used as a PDC cutting element when mounted to a bit body of a rotary drill bit by press-fitting, brazing, or otherwise securing the stud into a receptacle formed in the bit body.

Conventional PDCs are normally fabricated by placing a cemented carbide substrate into a container with a volume of diamond particles positioned adjacent to the cemented-carbide substrate. A number of such containers may be loaded into a HPHT press. The substrates and volume(s) of diamond particles are then processed under HPHT conditions in the presence of a catalyst material that causes the diamond particles to bond to one another to form a matrix of bonded-together diamond grains defining a polycrystalline diamond ("PCD") table that is bonded to the substrate. The catalyst material is often a metal-solvent catalyst (e.g., cobalt, nickel, iron, or alloys thereof) that is used for promoting intergrowth of the diamond particles.

In one conventional approach, a constituent of the cemented carbide substrate, such as cobalt from a cobalt-cemented tungsten carbide substrate, liquefies and sweeps from a region adjacent to the volume of diamond particles into interstitial regions between the diamond particles during the HPHT process. The cobalt acts as a catalyst to promote intergrowth between the diamond particles, which results in formation of bonded-together diamond grains exhibiting diamond-to-diamond bonding therebetween. Often, a solvent catalyst may be mixed with the diamond particles prior to subjecting the diamond particles and substrate to the HPHT process.

The presence of the metal-solvent catalyst in the PCD table is believed to reduce the thermal stability of the PCD table at elevated temperatures. For example, the difference in thermal expansion coefficient between the diamond grains and the metal-solvent catalyst is believed to lead to chipping or cracking of the PCD table during drilling or cutting operations, which can degrade the mechanical properties of the PCD table or cause failure. Additionally, some of the diamond grains can undergo a chemical breakdown or back-conversion to graphite via interaction with the metal-solvent catalyst. At elevated high temperatures, portions of diamond grains may transform to carbon monoxide, carbon dioxide, graphite, or combinations thereof, thereby degrading the mechanical properties of the PCD table.

One conventional approach for improving the thermal stability of a PCD table of a PDC is to at least partially remove the metal-solvent catalyst from the PCD table by acid leaching. Another conventional approach for forming a PDC includes separately forming a sintered PCD table that is subsequently leached to remove solvent catalyst from interstitial regions between bonded-together diamond grains. The leached PCD table may be bonded to a substrate and infiltrated with a non-catalyst material, such as silicon, in a separate HPHT process. The silicon may infiltrate the interstitial regions of the leached PCD table from which the solvent catalyst has been leached and react with the diamond grains to form silicon carbide.

Despite the availability of a number of different PDCs, manufacturers and users of PDCs continue to seek PDCs that exhibit improved toughness, wear resistance, thermal stability, ease of processing, or combinations of the foregoing.

SUMMARY

Embodiments of the invention relate to PDCs and methods of fabricating PDCs in a manner that facilitates removal of metal-solvent catalyst used in the manufacture of PCD tables of such PDCs. In an embodiment, a PDC includes a substrate and a PCD table including a working surface and an opposing interfacial surface bonded to the substrate. The PCD table includes a plurality of bonded diamond grains defining interstitial regions. The PCD table further includes a leached first volume extending inwardly from the working surface and including a metallic infiltrant disposed in at least a portion of the interstitial regions thereof. The metallic infiltrant of the leached first volume may be present in a concentration of less than 0.85 weight % ("wt %"). The PCD table also includes a second volume extending inwardly from the interfacial surface. The interstitial regions of the second volume include the metallic infiltrant disposed therein.

In an embodiment, a method of fabricating a leached PCD table is disclosed. The method includes mixing a plurality of diamond particles with a plurality of sacrificial particles to form a mixture. The method further includes sintering the mixture in the presence of a metal-solvent catalyst to form a PCD table. The PCD table comprises a sacrificial material including the plurality of sacrificial particles, at least one reaction product of the plurality of diamond particles and the plurality of sacrificial particles, or combinations thereof. The method additionally includes leaching at least a portion of the metal-solvent catalyst and at least a portion of the sacrificial material from the PCD table.

In an embodiment, a method of fabricating a leached PDC is disclosed. The method includes disposing a mixture adjacent to a substrate. The mixture includes a plurality of diamond particles and a plurality of sacrificial particles. The method also includes subjecting the mixture and the substrate to an HPHT process to sinter the plurality of diamond particles in the presence of a metal-solvent catalyst to form a PCD table over the substrate. The PCD table comprises a sacrificial material including the plurality of sacrificial particles, at least one reaction product of the plurality of diamond particles and the plurality of sacrificial particles, or combinations thereof. The method further includes leaching at least a portion of the metal-solvent catalyst and at least a portion of the sacrificial material from a volume of the PCD table.

In an embodiment, another method of fabricating a leached PDC is disclosed. The method includes mixing a plurality of diamond particles with a plurality of sacrificial particles to form a mixture. The method also includes sintering the mixture in the presence of a metal-solvent catalyst to form a PCD table. The PCD table comprises a sacrificial material including the plurality of sacrificial particles, at least one reaction product of the plurality of diamond particles and the plurality of sacrificial particles, or combinations thereof. The method additionally includes leaching at least a portion of the metal-solvent catalyst and at least a portion of the sacrificial material from the PCD table so that the metal-solvent catalyst is present therein in a concentration of less than 0.85 wt %. The method also includes positioning the leached PCD table adjacent to the substrate to form an assembly. The method further includes subjecting the assembly to an HPHT process to infiltrate the leached PCD table with a metallic infiltrant.

In an embodiment, a PDC includes a cemented tungsten carbide substrate and a pre-sintered PCD table bonded to the cemented tungsten carbide substrate. The pre-sintered PCD table includes a working surface and an opposing interfacial surface bonded to the cemented tungsten carbide substrate. The pre-sintered PCD table includes a plurality of bonded diamond grains defining a plurality of interstitial regions. The pre-sintered PCD table includes a first volume extending inwardly from the working surface that is substantially free of metal-solvent catalyst and at least one of tungsten or tungsten carbide. The pre-sintered PCD table further includes a second volume extending inwardly from the interfacial surface that comprises at least one of tungsten or tungsten carbide interstitially disposed between the bonded diamond grains thereof.

In an embodiment, a method of fabricating a PDC includes positioning a metallic infiltrant layer between a cemented carbide tungsten substrate and an at least partially leached PCD table including a plurality of interstitial regions therein to form an assembly. The metallic infiltrant layer is substantially free of tungsten, tungsten carbide, or combinations thereof. The method further includes subjecting the assembly to an HPHT process to infiltrate a first portion of the interstitial regions with a first metallic infiltrant from the metallic infiltrant layer and a second portion of the interstitial regions with a second metallic infiltrant from the cemented tungsten carbide substrate that includes tungsten, tungsten carbide, or combinations thereof.

In an embodiment, a method of fabricating a PDC includes positioning an at least partially leached PCD table including a plurality of interstitial regions therein between a metallic infiltrant layer and a cemented tungsten carbide substrate to form an assembly. The metallic infiltrant layer is substantially free of tungsten, tungsten carbide, or combinations thereof. The method further includes subjecting the assembly to an HPHT process to infiltrate a first portion of the interstitial regions with a first metallic infiltrant from the metallic infiltrant layer and a second portion of the interstitial regions with a second metallic infiltrant from the cemented tungsten carbide substrate that includes tungsten, tungsten carbide, or combinations thereof.

In an embodiment, a method of fabricating a PDC includes forming an assembly having a PCD table including a plurality of interstitial regions therein, a substrate, a metallic infiltrant layer positioned between the substrate and PCD table, and a dump region positioned adjacent to the PCD table. At least a portion of the interstitial regions of the PCD table includes a metal-solvent catalyst and a tungsten-containing material. The method further includes subjecting the assembly to an HPHT process to infiltrate a first portion of the interstitial regions with a first metallic infiltrant from the metallic infiltrant layer and a second portion of the interstitial regions with a second metallic infiltrant from the substrate, thereby displacing substantially all of the tungsten-containing material into the dump region. The method also includes removing the dump region including the displaced tungsten-containing material therein.

In an embodiment, a method of fabricating a PDC includes placing a mass of diamond particles at least proximate to a substrate. The method further includes infiltrating a first portion of a mass of diamond particles with a first metal-solvent catalyst material to sinter the first portion and form a first PCD volume. The method also includes infiltrating a second portion of the mass of diamond particles with a second metal-solvent catalyst that is less leachable than the first metal-solvent catalyst to sinter the second portion and form a second PCD volume. The first and second PCD volumes define a PCD table. The method also includes bonding the PCD table to the substrate. The method further includes leaching the first metal-solvent catalyst material from the PCD table to form a leached region. In some embodiments, the method further includes infiltrating the leached region with an infiltrant, such as silicon, a silicon alloy, or at least one alkali metal carbonate.

Other embodiments relate to applications utilizing the disclosed PDCs in various articles and apparatuses, such as rotary drill bits, bearing apparatuses, wire-drawing dies, machining equipment, and other articles and apparatuses.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the invention, wherein identical reference numerals refer to identical elements or features in different views or embodiments shown in the drawings.

DETAILED DESCRIPTION

Embodiments of the invention relate to PDCs and methods of fabricating PDCs and PCD tables in a manner that facilitates removal of metal-solvent catalyst used in the manufacture of PCD tables of such PDCs. The PDC embodiments disclosed herein may be used in a variety of applications, such as rotary drill bits, bearing apparatuses, wire-drawing dies, machining equipment, and other articles and apparatuses.

FIGS. 1A-1F illustrate different stages in various embodiments of a method for fabricating a PDC and the PDC so formed. According to the various embodiments described with respect to FIGS. 1A-1F, a PCD table of a PDC is formed by sintering the diamond particles with sacrificial particles, which facilitates removal of the metal-solvent catalyst from the PCD table so formed.

Figure 1A:
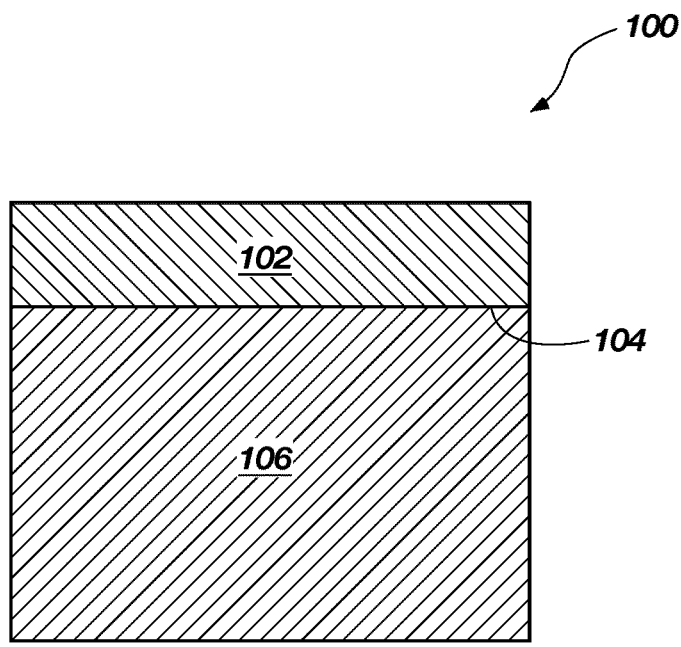
FIGS. 1A, 1B, 1D, 1E, and 1F are cross-sectional views illustrating different stages in various embodiments of a method for fabricating a PDC and the PDC so formed.

Referring to FIG. 1A, an assembly 100 may be formed by positioning a mixture 102 adjacent to an interfacial surface 104 of a substrate 106. The mixture 102 may include a plurality of diamond particles and a plurality of sacrificial particles. As discussed in further detail below, the sacrificial particles facilitate removal metal-solvent catalyst used to catalyze formation of a PCD table from the mixture 102. For example, the sacrificial particles may be present in the mixture in a concentration of greater than 0 wt % to about 15 wt %, about 1.0 wt % to about 10 wt %, about 1.0 wt % to about 5 wt %, about 1.5 wt % to about 2.5 wt %, about 1.0 wt % to about 2.0 wt %, or about 2.0 wt %, with the balance being the diamond particles. It is currently believed by the inventors that relatively low amounts of the sacrificial particles (e.g., less than about 5 wt %, less than about 3 wt %, or less than about 2 wt %) increases accessibility for leaching the PCD table without significantly affecting the wear properties of the PCD table. The sacrificial particles may exhibit an average particle size (e.g., an average diameter) of about submicron to about 10 μm, about submicron to about 5 μm, less than about 5 μm, about submicron to about 2 μm, about submicron to about 1 μm, less than about 1 μm, or nanometer in dimensions such as about 10 nm to about 100 nm.

The sacrificial particles may be made from any material that exhibits a melting temperature greater than that of a melting temperature of the metal-solvent catalyst used to catalyze formation of PCD from the diamond particles and that is leachable from the PCD so formed via a leaching process. The sacrificial particles may be selected from particles made from metals, alloys, carbides, and combinations thereof that exhibit a melting temperature greater than that of a melting temperature of the metal-solvent catalyst used to catalyze formation of PCD from the diamond particles and that is leachable from the PCD so formed via a leaching process. For example, the sacrificial particles may be selected from particles made of refractory metals (e.g., niobium, molybdenum, tantalum, tungsten, rhenium, hafnium, and alloys thereof), other metals or alloys exhibiting a melting temperature greater than that of a melting temperature of the metal-solvent catalyst used to catalyze formation of PCD from the diamond particles and that is leachable from the PCD so formed via a leaching process, and combinations thereof. As another example, the sacrificial particles may be selected from particles of titanium, vanadium, chromium, iron, zirconium, niobium, molybdenum, hafnium, tantalum, tungsten, rhenium, any other metal or alloy that exhibits a melting temperature greater than that of a melting temperature of the metal-solvent catalyst used to catalyze formation of PCD from the diamond particles and that is leachable from the PCD so formed via a leaching process, alloys of any of the foregoing metals, carbides of any of the foregoing metals or alloys, and combinations of the foregoing. For example, in a more specific embodiment, the sacrificial particles may be selected from tungsten particles and/or tungsten carbide particles.

In some embodiments, the metal-solvent catalyst used to catalyze formation of the PCD may be diffusible and/or interdiffusible into the sacrificial particles during the HPHT process used to form the PCD. It is noted that although the above-mentioned sacrificial particles are inorganic (e.g., metal, alloys, or carbides), in other embodiments, an organic sacrificial material may be employed. For example, the organic sacrificial material may be wax, polyethylene glycol, mixtures thereof, combinations thereof, or other suitable sacrificial material.

The diamond particles of the mixture 102 may exhibit a relatively larger size and at least one relatively smaller size. As used herein, the phrases "relatively larger" and "relatively smaller" refer to particle sizes (by any suitable method) that differ by at least a factor of two (e.g., 30 μm and 15 μm). According to various embodiments, the diamond particles may include a portion exhibiting a relatively larger size (e.g., 30 μm, 20 μm, 15 μm, 12 μm, 10 μm, 8 μm) and another portion exhibiting at least one relatively smaller size (e.g., 6 μm, 5 μm, 4 μm, 3 μm, 2 μm, 1 μm, 0.5 μm, less than 0.5 μm, 0.1 μm, less than 0.1 μm). In an embodiment, the diamond particles may include a portion exhibiting a relatively larger size between about 10 μm and about 40 μm and another portion exhibiting a relatively smaller size between about 1 μm and 4 μm. In some embodiments, the diamond particles may comprise three or more different sizes (e.g., one relatively larger size and two or more relatively smaller sizes), without limitation.

The substrate 106 may include, without limitation, cemented carbides, such as tungsten carbide, titanium carbide, chromium carbide, niobium carbide, tantalum carbide, vanadium carbide, or combinations thereof cemented with iron, nickel, cobalt, or alloys thereof. For example, in an embodiment, the substrate 106 comprises cobalt-cemented tungsten carbide. Although the interfacial surface 104 of the substrate 106 is illustrated as being substantially planar, the interfacial surface 104 may exhibit a selected nonplanar topography.

The assembly 100 may be placed in a pressure transmitting medium, such as a refractory metal can, graphite structure, pyrophyllite, or other pressure transmitting structure. The pressure transmitting medium, including the assembly 100, may be subjected to an HPHT process using an HPHT press to create temperature and pressure conditions at which diamond is stable. The temperature of the HPHT process may be at least about 1000° C. (e.g., about 1300° C. to about 1600° C.) and the pressure of the HPHT process may be at least 4.0 GPa (e.g., about 5.0 GPa to about 10.0 GPa, about 6.0 GPA to about 8.5 GPa, etc.) for a time sufficient to infiltrate the mixture 106 with a metal-solvent catalyst (i.e., a metallic infiltrant) from the substrate 106 to form a PDC 108. The infiltrated metal-solvent catalyst catalyzes formation of PCD from the diamond particles to form a PCD table 110 shown in FIGS. 1B and 1C. For example, cobalt from a cobalt-cemented tungsten carbide substrate may infiltrate into the mixture 102 to catalyze formation of the PCD table 110. The PCD table 110 is integrally formed with the substrate 106 (i.e., formed by sintering the precursor materials on the substrate 106).

The PCD table 110 includes a plurality of directly bonded-together diamond grains exhibiting diamond-to-diamond bonding (e.g., $sp^3$ bonding) therebetween. The PCD table 110 is bonded to the interfacial surface 104 of the substrate 102 by a strong bond, such as a metallurgical bond, as a result of the metal-solvent catalyst infiltration. The PCD table 110 includes an upper working surface 112, a side surface 114, and a chamfer 116 extending therebetween. The chamfer 116 may be machined into the PCD table 110 after being formed or may be pre-formed in the PCD table 110. Generally, the smaller the average particle size of the sacrificial particles used in the mixture 102, the greater the concentration of metal-solvent catalyst incorporated into the PCD table 110.

The bonded-together diamond grains of the PCD table 110 defines a plurality of interstitial regions. The interstitial regions include a sacrificial material (e.g., tungsten carbide grains) and/or the infiltrated metal-solvent catalyst disposed therein. The sacrificial material may include at least one reaction product formed from sacrificial particles that at least partially react with the diamond particles during HPHT processing and/or the sacrificial particles that are present in the mixture 102. For example, tungsten sacrificial particles at least partially react with the diamond particles to form tungsten carbide grains. The concentration of the metal-solvent catalyst incorporated into the PCD table 110 may be greater than if the PCD table 110 was formed without using the sacrificial particles. When the substrate 106 includes cobalt-cemented tungsten carbide particles, a cobalt alloy infiltrates into the mixture 102 and is disposed interstitially between the bonded-together diamond grains. The cobalt alloy may include tungsten in solid solution with cobalt and may include tungsten carbide precipitates.

Figure 1B:
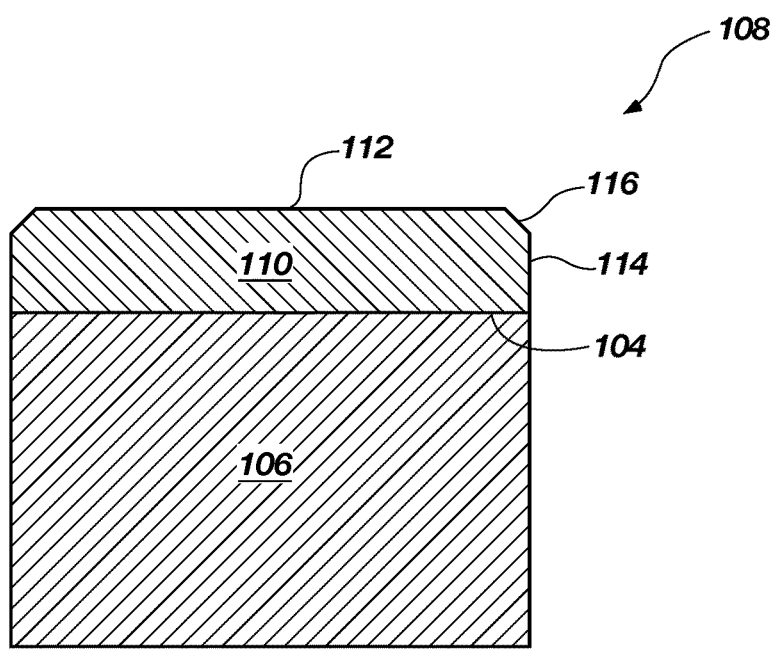
Figure 1C:
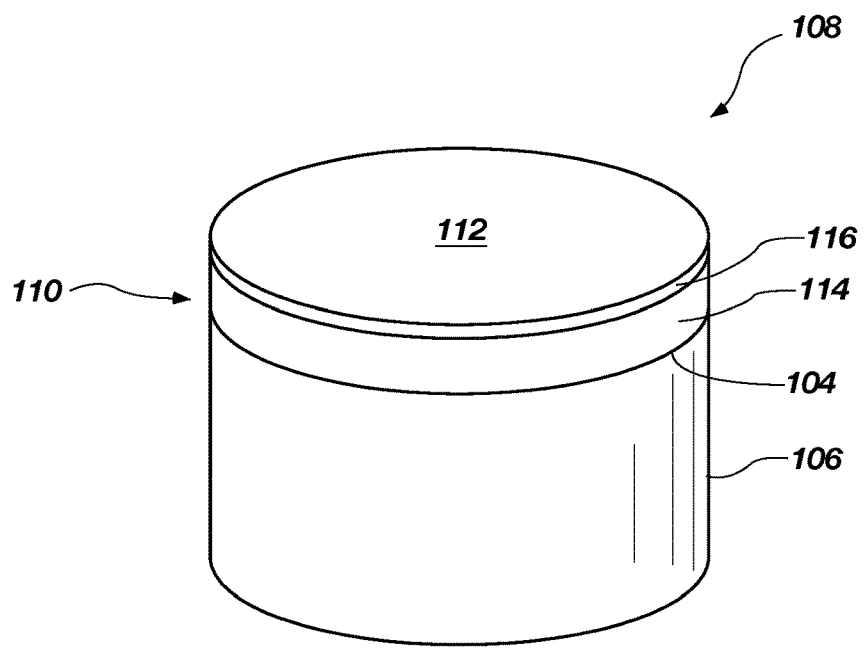
FIG. 1C is an isometric view of the PDC shown in FIG. 1B.
Figure 1D:
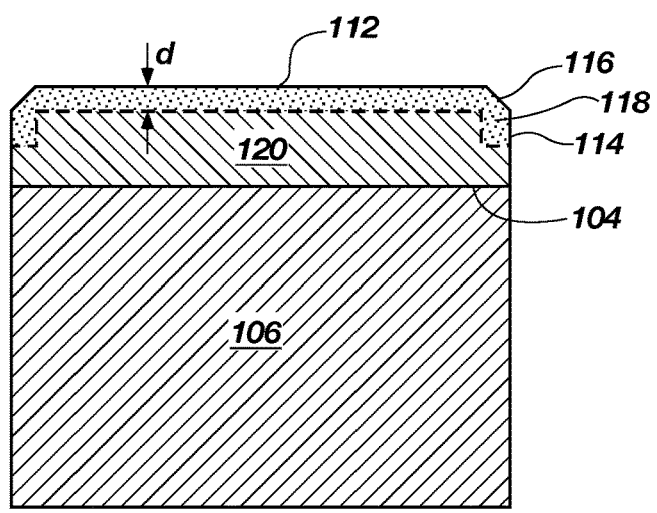

Referring to FIG. 1D, the PCD table 110 of the PDC 108 shown in FIGS. 1B and 1C, is exposed to an acid to leach at least a portion of the metal-solvent catalyst and at least a portion of the sacrificial material from the interstitial regions to form a leached first volume 118, with the relatively unaffected underlying PCD table 110 referenced as second volume 120. Suitable acids include, but are not limited to, dilute nitric acid (e.g., about 0.5 M to about 1.5 M), concentrated nitric acid (e.g., about 4 M to about 5 M), hydrofluoric acid, or mixtures thereof. For example, the PCD table 110 may be exposed to any of such acids for about 2 to about 7 days (e.g., about 3, 5, or 7 days) or even for a few weeks (e.g., about 2 to about 4 weeks). Hydrofluoric acid may enhance removal of the tungsten carbide grains because tungsten oxide may be formed as a reaction product between water, and tungsten carbide is soluble in hydrofluoric acid.

The leached first volume 118 extends inwardly from the working surface 112, the side surface 114, and the chamfer 116 to a leach depth d. Although the leach depth d is illustrated as being uniform throughout the leached first volume 118, in some embodiments, the leach d may decrease in a peripheral volume at and near the chamfer 116 and side surface 114 of the PCD table 110.

The concentration of the metal-solvent catalyst remaining in the leached first volume 118 may be less than 0.85 wt %, about greater than 0 wt % to about 0.80 wt %, about greater than 0 wt % to about 0.75 wt %, about 0.20 wt % to about 0.75 wt %, about 0.20 wt % to about 0.65 wt %, about 0.20 wt % to about 0.55 wt %, about 0.3 wt % to about 0.55 wt %, or about 0.50 wt % to about 0.78 wt %. The leach depth d of the leached first volume 118 may be about 250 µm to about 400 µm, about 250 µm to about 350 µm, about 250 µm to about 300 µm, or about 250 µm to about 275 µm. It is currently believed by the inventors that the presence of a sacrificial material (e.g., tungsten carbide grains) in the PCD table 110 may increase the volume of the interstitial regions between the bonded-together diamond grains, thereby increasing the leaching efficiency of the acid. In other words, the acid has better access to the metal-solvent catalyst interstitially disposed between the bonded-together diamond grains, thereby allowing an increased amount of the metal-solvent catalyst to be leached/removed compared to if the PCD table 110 was not fabricated using the sacrificial particles of the mixture 102. Generally, the smaller the average particle size of the sacrificial particles used in the mixture 102, the greater the volume of interstitial regions in the PCD table 110.

As discussed above, in some embodiments, the substrate 102 may include cobalt-cemented tungsten carbide particles. In such embodiments, despite the presence of the tungsten in the infiltrated cobalt alloy which may make the cobalt alloy more difficult to leach, the increased interstitial region volume or accessibility as a result of the sacrificial material previously occupying some of the interstitial regions still allows for efficient removal of the metal-solvent catalyst from the PCD table 110.

The concentration of the remaining metal-solvent catalyst in the leached first volume 118 may be determined using a number of different analytical techniques. For example, energy dispersive spectroscopy (e.g., EDAX), wavelength dispersive x-ray spectroscopy (e.g., WDX), and/or Rutherford backscattering spectroscopy may be employed to determine the amount of metal-solvent catalyst in the leached first volume 118.

The concentration of the metal-solvent catalyst in the leached first volume 118 may also be determined based on the magnetic properties of the leached first volume 118. For example, the substrate 106 and the second volume 120 may be removed via electro-discharge machining, grinding, or combinations thereof to form a PCD sample. A specific magnetic saturation constant of the metal-solvent catalyst in the PCD sample may be determined using an iterative approach. A value for the specific magnetic saturation constant of the metal-solvent catalyst in the PCD sample may be iteratively chosen until a metal-solvent catalyst concentration calculated by the analysis software of a commercially available KOERZIMAT CS 1.096 instrument using the chosen value substantially matches the metal-solvent catalyst concentration determined via another analytical technique, such as energy dispersive spectroscopy, wavelength dispersive x-ray spectroscopy, Rutherford backscattering spectroscopy, or combinations thereof.

Figure 1E:
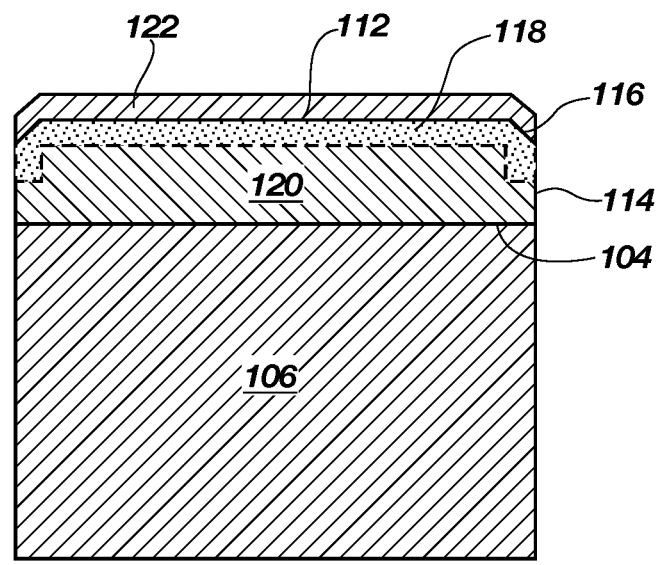
Figure 1F:
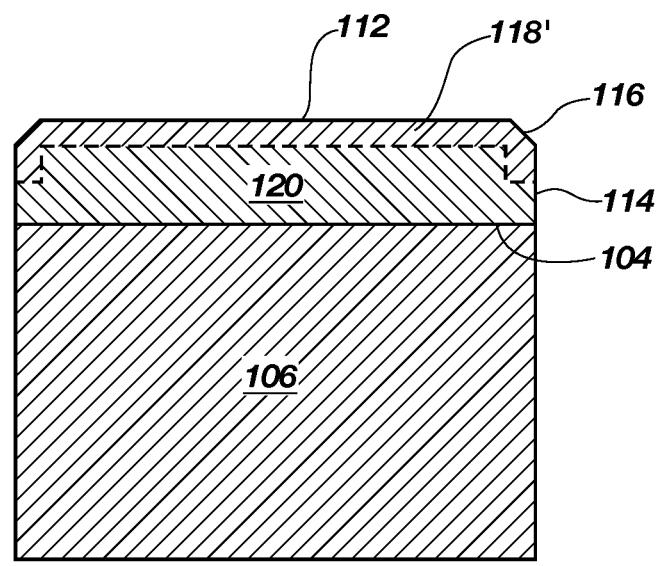

In some embodiments, an infiltrant/replacement material may fill the interstitial regions of the first leached volume 118 in order to enhance wear resistance of the PDC 308. Referring to FIG. 1E, a layer 122 of infiltrant material may be positioned adjacent to the working surface 112. In an embodiment, the layer 122 may comprise silicon particles or a thin disc of silicon. In another embodiment, the layer 122 may comprise silicon and another constituent such as, cobalt, iron, nickel, or alloys thereof so that a silicon alloy is formed upon infiltration into the interstitial regions of the leached first volume 118. In a further embodiment, the layer 122 may comprise a silicon alloy alloyed with cobalt, iron, nickel, or combinations thereof. In yet another embodiment, the layer 122 may comprise an alkali metal carbonate, such as at least one alkali carbonate of Li, Na, or K. Various alkali carbonate materials are disclosed in U.S. patent application Ser. No. 12/185,457, the disclosure of which is incorporated herein, in its entirety, by this reference. The in-process structure shown in FIG. 1E may be subjected to an HPHT process sufficient to melt the layer 122 so that infiltrant/replacement material infiltrates into the interstitial regions of the leached first volume 118 to form an infiltrated first volume 118' as shown in FIG. 1F.

In the embodiment when the layer 122 comprises silicon, the silicon infiltrated into the leached first volume 118 during the HPHT infiltration process reacts with the diamond grains to form silicon carbide that is interstitially disposed between the bonded-together diamond grains. In the embodiment when the layer 122 comprises one or more alkali metal carbonates, the infiltrated interstitial regions may include one or more alkali metal carbonates, one or more alkali metal oxides, or combinations thereof.

FIGS. 2A-2F are cross-sectional views illustrating different stages in various embodiments of a method for fabricating a "two-step" PDC and the PDC so formed. According to the various embodiments described with respect to FIGS. 2A-2F, a PCD table is formed by sintering the diamond particles with sacrificial particles in a first HPHT process, the PCD table so formed is leached, and the leached PCD table may be bonded to a substrate in a second HPHT process.

Figure 2A:
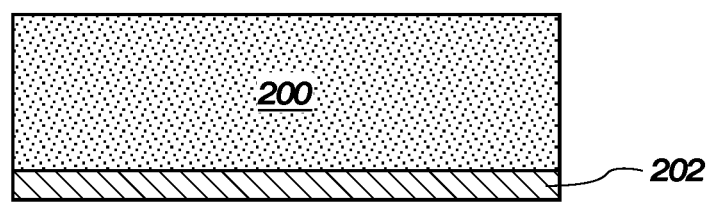
FIGS. 2A-2F are cross-sectional views illustrating different stages in various embodiments of a method for fabricating a PDC and the PDC so formed.

Referring to FIG. 2A, a mixture 200 is provided that includes a plurality of diamond particles and a plurality of sacrificial particles. For example, the sacrificial particles may be present in the mixture in a concentration of greater than 0 wt % to about 15 wt %, about 1.0 wt % to about 10 wt %, about 1.0 wt % to about 5 wt %, about 1.5 wt % to about 2.5 wt %, about 1.0 wt % to about 2.0 wt %, or about 2.0 wt %, with the balance being the diamond particles. The sacrificial particles may be selected from any of the sacrificial particles and/or materials disclosed herein and may exhibit any of the average particle sizes disclosed hereinabove for sacrificial particles. The diamond particles may exhibit any of the diamond particle sizes and distributions disclosed herein. In an embodiment, the sacrificial particles may have an average particle size that is less than an average particle size of the diamond particles.

The mixture 200 may be positioned adjacent to a metal-solvent catalyst, such as a layer 202 of metal-solvent catalyst. In an embodiment, the layer 202 of metal-solvent catalyst may comprise iron, nickel, cobalt, or alloys thereof. In an embodiment, as an alternative to or in addition to the layer 202, the metal-solvent catalyst may be provided by mixing metal-solvent catalyst particles with the diamond particles and sacrificial particles, infiltrating metal-solvent catalyst from a cemented carbide substrate (e.g., cobalt from a cobalt-cemented tungsten carbide substrate), or combinations of the foregoing.

The mixture 200 and the layer 202 may be placed in a suitable pressure transmitting medium, and subjected to a first HPHT process using an HPHT press using the same or similar HPHT process conditions used to process the assembly 100 shown in FIG. 1A. During the first HPHT process, the mixture 200 is infiltrated with a metal-solvent catalyst (i.e., a metallic infiltrant) from the layer 202 to form a PCD table. The metal-solvent catalyst catalyzes formation of PCD from the diamond particles to form the PCD table. The PCD table includes a plurality of directly bonded-together diamond grains exhibiting diamond-to-diamond bonding (e.g., sp$^3$ bonding) therebetween.

The bonded-together diamond grains of the PCD table defines a plurality of interstitial regions. The interstitial regions include a sacrificial material (e.g., tungsten carbide grains) and/or the infiltrated metal-solvent catalyst disposed therein. The sacrificial material may include at least one reaction product formed from the sacrificial particles that at least partially react with the diamond particles during HPHT processing and/or the sacrificial particles that are present in the mixture 200. For example, when present, tungsten sacrificial particles may at least partially react with the diamond particles to form tungsten carbide grains.

The PCD table so formed may exhibit a diamond grain size distribution that is the same or similar to any of the diamond particle size distributions disclosed herein. For example, the diamond grains may be less than about 30 μm, less than about 20 μm, less than about 15 μm, less than about 12 μm, less than about 10 μm, less than about 8 μm, about 10 μm to about 30 μm, or about 15 μm to about 19 μm. In some embodiments, the diamond grains may include a portion exhibiting a relatively larger average grain size (e.g., 30 μm, 20 μm, 15 μm, 12 μm, 10 μm, 8 μm) and another portion exhibiting at least one relatively smaller average grain size (e.g., 6 μm, 5 μm, 4 μm, 3 μm, 2 μm, 1 μm, 0.5 μm, less than 0.5 μm, 0.1 μm, less than 0.1 μm).

Figure 2B:
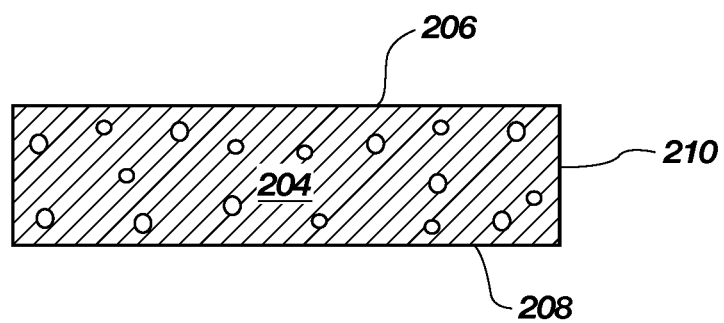

Referring to FIG. 2B, the PCD table is exposed to an acid to leach at least a portion of the metal-solvent catalyst and at least a portion of the sacrificial material from the interstitial regions to form an at least partially leached PCD table 204. Suitable acids include, but are not limited to, dilute nitric acid (e.g., about 0.5 M to about 1.5 M), concentrated nitric acid (e.g., about 4 M to about 5 M), hydrofluoric acid, or mixtures thereof. The at least partially leached PCD table 204 includes a first surface 206 and an opposing second surface 208, with the interstitial regions having been leached of the metal-solvent catalyst and the sacrificial material so that the interstitial regions form a network of at least partially interconnected pores configured to allow fluid to flow between and through the first and second surfaces 206 and 208. A side surface 210 extends between the first and second surfaces 206 and 208.

The concentration of the metal-solvent catalyst remaining in the leached PCD table 204 after leaching may be less than 0.85 wt %, about greater than 0 wt % to about 0.80 wt %, about greater than 0 wt % to about 0.75 wt %, about 0.20 wt % to about 0.75 wt %, about 0.20 wt % to about 0.65 wt %, about 0.20 wt % to about 0.55 wt %, about 0.3 wt % to about 0.55 wt %, or about 0.50 wt % to about 0.78 wt %.

Figure 2C:
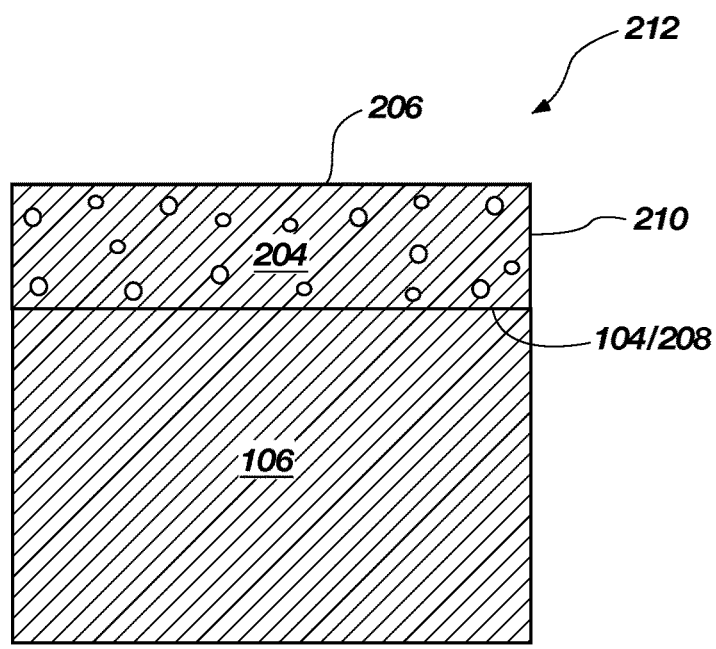
Figure 2D:
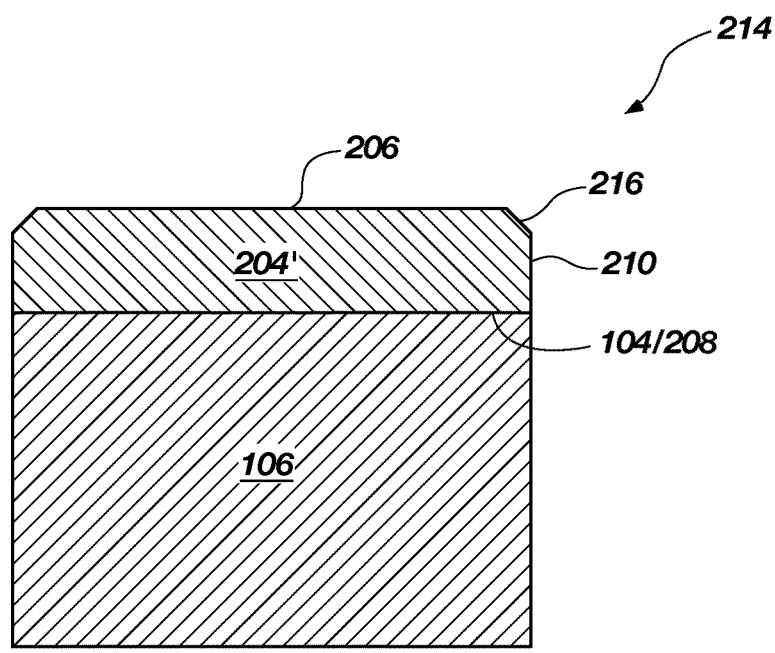

Referring to FIG. 2C, an assembly 212 may be formed by positioning the second surface 208 of the at least partially leached PCD table 204 adjacent to the interfacial surface 104 of the substrate 106. Although the interfacial surface 104 of the substrate 106 is illustrated as being substantially planar, the interfacial surface 104 may exhibit a nonplanar topography and the second surface 208 of the at least partially leached PCD table 204 may exhibit a correspondingly configured nonplanar topography. The assembly 212 may be enclosed in a suitable pressure transmitting medium and subjected to a second HPHT process using the same or similar conditions as the first HPHT process. During the second HPHT process the at least partially leached PCD table 106 is infiltrated with a metallic infiltrant from the substrate 106 to form an infiltrated PCD table 204' (i.e., a pre-sintered PCD table) as shown in FIG. 2D. For example, cobalt from a cobalt-cemented tungsten carbide substrate may infiltrate the at least partially leached PCD table 204 during the second HPHT process. The substrate 106 bonds to the infiltrated PCD table 204' upon cooling to form a PDC

214 also shown in FIG. 2D. As shown in FIG. 2D, the infiltrated PCD table 204' may be machined by, for example, grinding to form a chamfer 216 that extends between the first surface 206 (i.e., a working surface) and the side surface 210. In another embodiment, the chamfer 116 may be formed in the at least partially leached PCD table 204 prior to infiltration thereof.

Even without leaching, the infiltrated PCD table 204' shown in FIG. 2D may exhibit a thermal stability superior to that of a conventionally formed PCD table that is integrally formed on a cemented carbide substrate and leached to a depth of about 80 μm to about 100 μm. For example, the infiltrated PCD table 204' may be able to cut a granite workpiece in a lathe test (e.g., a vertical turret lathe test) a distance of at least about 600 m without failing, such as about 900 m to about 2300 m, about 1500 m to about 2000 m, or about 2000 m to about 2300 m. An example of suitable parameters for a vertical turret lathe test, which may be used to determine thermal stability of the infiltrated PCD table 204', are a depth of cut for the PDC of about 1.27 mm, a back rake angle for the PDC of about 20 degrees, an in-feed for the PDC of about 1.524 mm/rev, a cutting speed of the workpiece to be cut of about 1.78 m/sec, and the workpiece may be made from Barre granite having a 914 mm outer diameter and a 254 mm inner diameter.

Figure 2E:
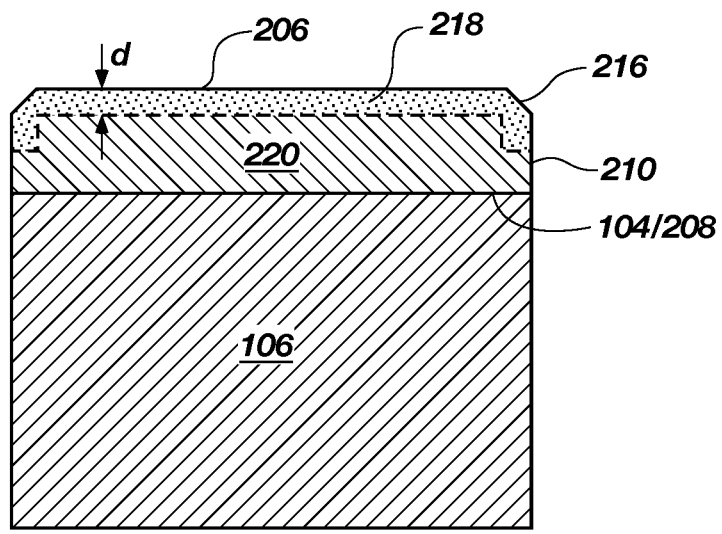

In some embodiments, the infiltrated PCD table 204' may be leached to a selected depth d to further improve the thermal stability of the PDC 214. Referring to FIG. 2E, the infiltrated PCD table 204' shown in FIG. 2D, may be exposed to any of the acids disclosed herein to leach the metallic infiltrant from the interstitial regions to form a leached first volume 218. The relatively unaffected underlying infiltrated PCD table 204' is labeled as second volume 220. The leached first volume 118 extends inwardly from the working surface 208, the side surface 210, and the chamfer 216 to a leach depth d. Although the leach d is illustrated as being uniform throughout the leached first volume 218, in some embodiments, the leach depth d may decrease in a peripheral volume at and near the chamfer 216 and side surface 210 of the infiltrated PCD table 204'.

The concentration of the metallic infiltrant remaining in the leached first volume 218 after leaching may be less than 0.8 wt %, about greater than 0 wt % to about 0.75 wt %, about 0.20 wt % to about 0.75 wt %, about 0.20 wt % to about 0.65 wt %, about 0.20 wt % to about 0.55 wt %, about 0.3 wt % to about 0.55 wt %, or about 0.50 wt % to about 0.78 wt %. The leach depth d of the leached first volume 218 may be about 250 μm to about 400 μm, about 250 μm to about 350 μm, about 250 μm to about 300 μm, or about 250 μm to about 275 μm. It is currently believed that use of sacrificial particles in the fabrication of the at least partially leached PCD table 204 increases the volume of the interstitial regions between the bonded-together diamond grains in the at least partially leached PCD table 204. The increased volume in the at least partially leached PCD table 204 also helps remove the metallic infiltrant therefrom after the second HPHT process.

As with the embodiments described with respect to FIGS. 1A-1F, in some embodiments, the substrate 102 may include cobalt-cemented tungsten carbide particles. In such embodiments, despite the presence of the tungsten in the infiltrated cobalt alloy which ordinarily makes the cobalt alloy more difficult to remove, forming the at least partially leached PCD table 204 with the sacrificial particles incorporated therein still enhances removal of the metal-solvent catalyst from the infiltrated PCD table 204' even after the sacrificial material has been removed because of the increased interstitial region volume between the bonded-together diamond grains.

Figure 2F:
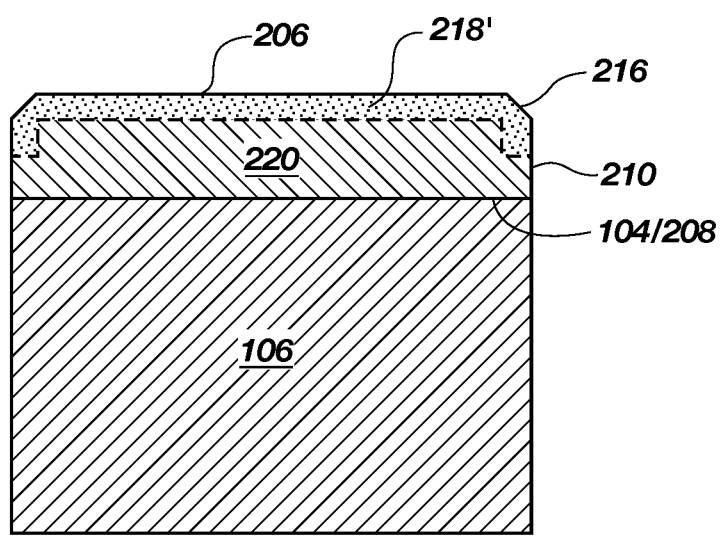

Referring to FIG. 2F, in some embodiments, an infiltrant/replacement material may fill the interstitial regions of the leached first volume 218 to form an infiltrated first volume 218' in order to enhance wear resistance of the leached first volume 218. Any of the infiltrant/replacement materials and process described with respect to FIGS. 1E and 1F may be employed for infiltrating the leached first volume 218.

Figure 3A:
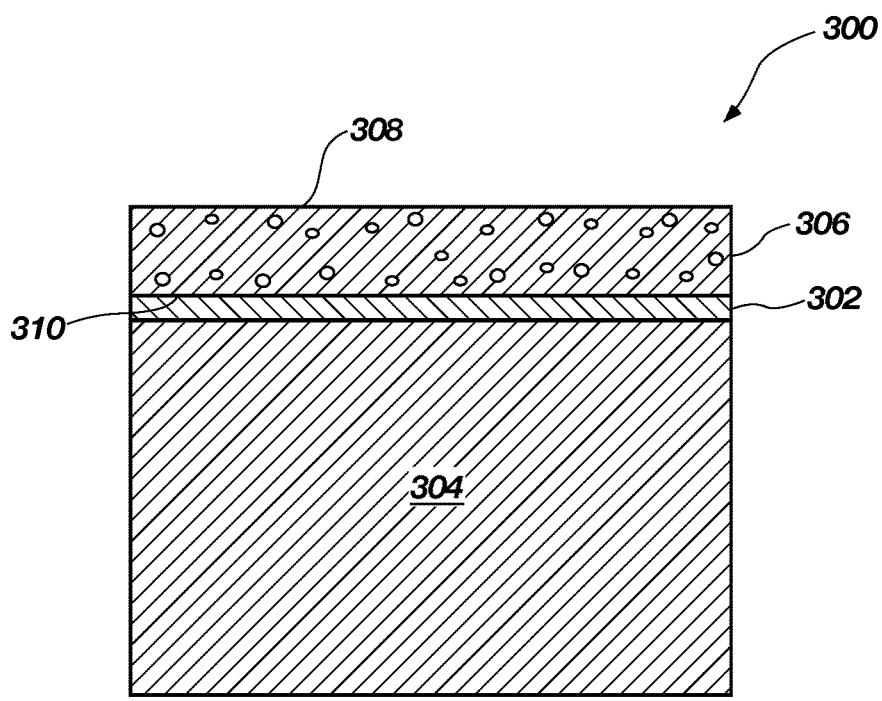
FIGS. 3A-3C are cross-sectional views illustrating different stages in various embodiments of a method for fabricating a PDC and the PDC so formed.
Figure 3B:
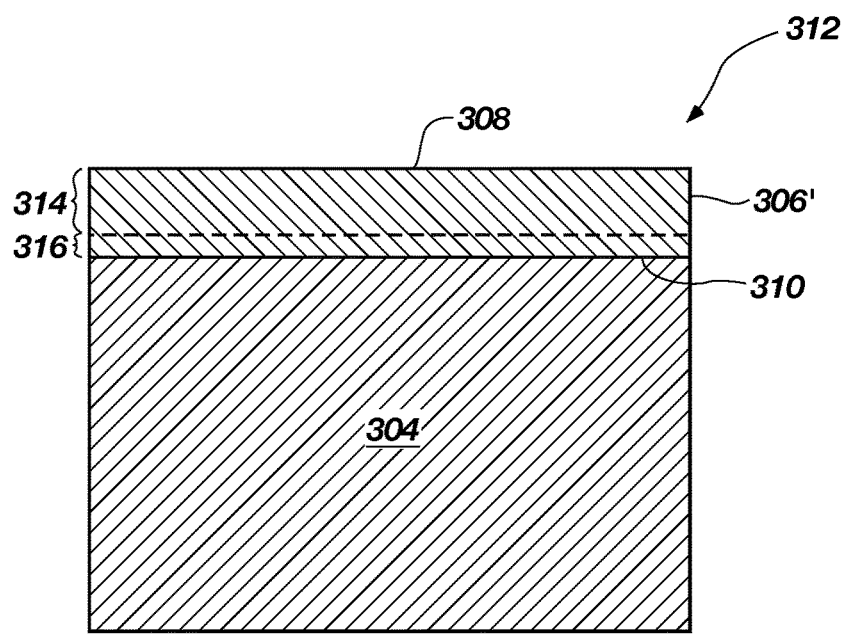
Figure 3C:
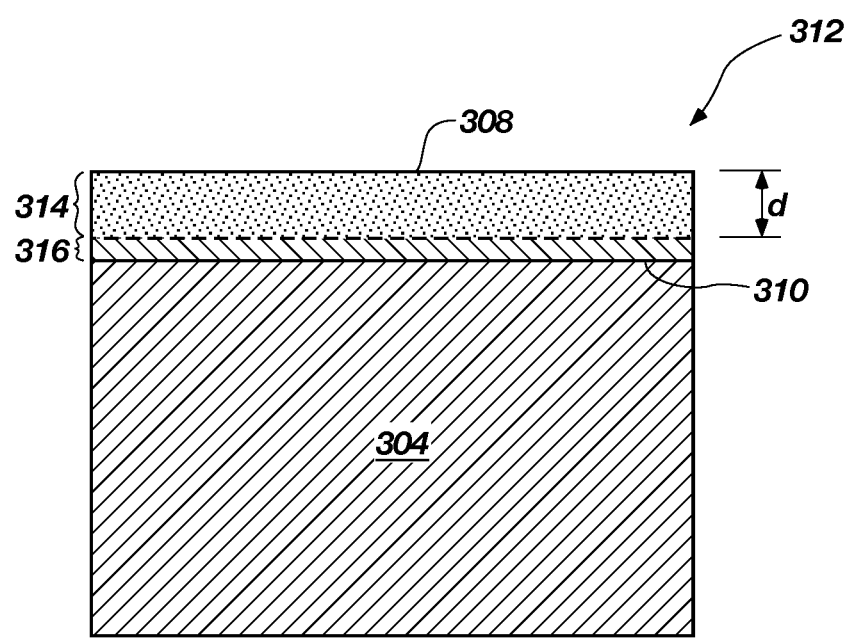

FIGS. 3A-3C are cross-sectional views illustrating different stages in various embodiments of a method for fabricating a PDC and the PDC so formed. According to the various embodiments described with respect to FIGS. 3A-3C, a PCD table of a PDC so formed may include a region that is substantially free of tungsten and/or tungsten carbide to facilitate removal of a metallic infiltrant therefrom.

Referring to FIG. 3A, an assembly 300 may be formed by positioning a metallic infiltrant layer 302 between a cemented tungsten carbide substrate 304 and an at least partially leached PCD table 306. The at least partially leached PCD table 306 includes a working surface 308, an opposing interfacial surface 310 positioned adjacent to the metal-solvent catalyst layer 302, and a side surface 311 extending between the working surface 308 and the interfacial surface 310. The at least partially leached PCD table 306 also includes a plurality of interstitial regions that were previously occupied by a metal-solvent catalyst that was used to initially catalyze formation of the at least partially leached PCD table 306 and form a network of at least partially interconnected pores that extend between the working surface 308 and interfacial surface 310. The at least partially leached PCD table 306 may be formed using sacrificial particles in the same manner as the at least partially leached PCD table 204 shown in FIG. 2B or may be formed without using sacrificial particles. It should be noted that the at least partially leached PCD table 306 may include a chamfer extending between the working surface 306 and the side surface 311. The chamfer and/or a portion of the side surface 311 may also function as a working surface or region.

The metallic infiltrant layer 302 may comprise cobalt, nickel, iron, or alloys thereof and may also be substantially free of tungsten and/or tungsten carbide. In an embodiment, the metallic infiltrant layer 302 may comprise substantially pure cobalt (e.g. a cobalt-based material including greater than about 95 wt % cobalt) or a cobalt alloy that is substantially free of tungsten and/or tungsten carbide. In a more specific embodiment, the metallic infiltrant layer 302 may comprise a thin disc of substantially pure cobalt or a cobalt alloy that is substantially free of tungsten and/or tungsten carbide. For example, the substantially pure cobalt may be commercially pure cobalt. In another more specific embodiment, the metallic infiltrant layer 302 may comprise cobalt particles held together by an organic binder to form a green layer of cobalt particles, with the cobalt particles being substantially free of tungsten and/or tungsten carbide.

The cemented tungsten carbide substrate 304 may comprise a cobalt-cemented tungsten carbide material. The cemented tungsten carbide substrate 304 may also include cemented carbides other than tungsten carbide including, without limitation, titanium carbide, niobium carbide, chromium carbide, tantalum carbide, vanadium carbide, or combinations of any of the preceding carbides cemented with cobalt, iron, nickel, or alloys thereof.

The assembly 300 may be placed in a suitable pressure transmitting medium, and subjected to an HPHT process using an HPHT press to create temperature and pressure conditions at which diamond is stable. The process conditions of the HPHT process may be the same or similar as employed to form the PDC 108 shown in FIG. 1B. During the HPHT process, the at least partially leached PCD table 306 is infiltrated to form an infiltrated PCD table 306', and bonds to the cemented tungsten carbide substrate 304 upon cooling to form a PDC 312.

During the HPHT process, a first metallic infiltrant (e.g., commercially pure cobalt substantially free of tungsten and/or tungsten carbide) infiltrates from the metallic infiltrant layer 302 and occupies a substantial portion of the interstitial regions in a first volume 314 of the PCD table 306' that extends inwardly from the working surface 308. The temperature of the HPHT process is also sufficient to melt a second metallic infiltrant of the substrate 304 (e.g., cobalt from a cobalt-cemented tungsten carbide substrate) that carries tungsten and/or tungsten carbide therewith. A second volume 316 of the PCD table 306' extends inwardly from the interfacial surface 310 and the interstitial regions thereof are infiltrated by a liquefied second metallic infiltrant from the substrate 304 that contains tungsten and/or tungsten carbide. For example, the second metallic infiltrant may be present in the substrate 304 as a cementing constituent and may comprise cobalt, nickel, iron, or alloys thereof, which sweeps in tungsten and/or tungsten carbide from the substrate 304 during infiltration of the second volume 316. In some embodiments, the volume of the metallic infiltrant layer 302 may be selected so that first volume 314 is relatively thicker compared to the second volume 316, and the first metallic infiltrant from the metallic infiltrant layer 302 occupies at least a majority of the interstitial regions of the PCD table 306'.

As a result of the tungsten and/or tungsten carbide sweeping into the second volume 316 with the second metallic infiltrant during the HPHT process, a number of different phases may be present in the interstitial regions of the second volume 316 of the PCD table 306'. For example, one or more of the following phases may be present in the interstitial regions of the second volume 316: a metal alloy (e.g., a cobalt-tungsten alloy) including tungsten as an alloying element formed from the second metallic infiltrant being alloyed with tungsten from the substrate 304, substantially pure tungsten, or tungsten carbide (e.g., WC and/or $W_2C$). When the substrate 304 includes chromium carbide and/or tantalum carbide, one or more of the following phases may also be present in the interstitial regions of the second volume 316: chromium, chromium carbide, tantalum, or tantalum carbide.

Referring to FIG. 3C, in order to improve thermal stability of the PDC 312, the first metallic infiltrant occupying the interstitial regions in the first volume 314 may be leached to a leach depth d from the working surface 308. In an embodiment, the leaching process may be performed for at least about 2 to about 7 days to remove substantially all of the first metallic infiltrant from the first volume 314. Because the first metallic infiltrant in the first volume 314 is substantially free of tungsten and/or tungsten carbide, the leaching may be performed relatively quicker and more effectively than if the at least partially leached PCD table 306 was completely infiltrated with a metallic infiltrant material including tungsten and/or tungsten carbide. For example, any of the acids disclosed herein may be used to leach the first metallic infiltrant in the first volume 314. Despite leaching the first metallic infiltrant from the first volume 314, residual amounts of the first metallic infiltrant may still be present. Further, the first volume may be identifiable as being substantially free of tungsten and/or tungsten carbide. In an embodiment, a portion of the second metallic infiltrant may be removed from the second volume 316 for enhancing thermal stability.

In the illustrated embodiment shown in FIG. 3C, the leach depth d may extend approximately the entire thickness of the first volume 314, which may be greater than about 200 μm. In another embodiment, the leach depth d may be about 50 μm to about 500 μm. In some embodiments, the leach depth d may extend partially into the second volume 316 and a portion of the second metallic infiltrant may be removed.

In some embodiments, an infiltrant/replacement material may fill the interstitial regions of the leached first volume 314 in order to enhance wear resistance of the leached first volume 218. Any of the infiltrant/replacement materials and processes described with respect to FIGS. 1E and 1F may be employed for infiltrating the leached first volume 314.

In another embodiment, a PDC having a PCD table exhibiting the same or similar construction as the PCD table 306' may be formed by subjecting an assembly to an HPHT process in which the at least partially leached PCD table 306 is positioned between the metallic infiltrant layer 302 and the cemented tungsten carbide substrate 304. The HPHT conditions employed in such an embodiment may be the same or similar to the HPHT conditions used to HPHT process the assembly 300 shown in FIG. 3A. After HPHT processing, the PDC so formed may be leached as described above with respect to FIG. 3C.

Figure 4A:
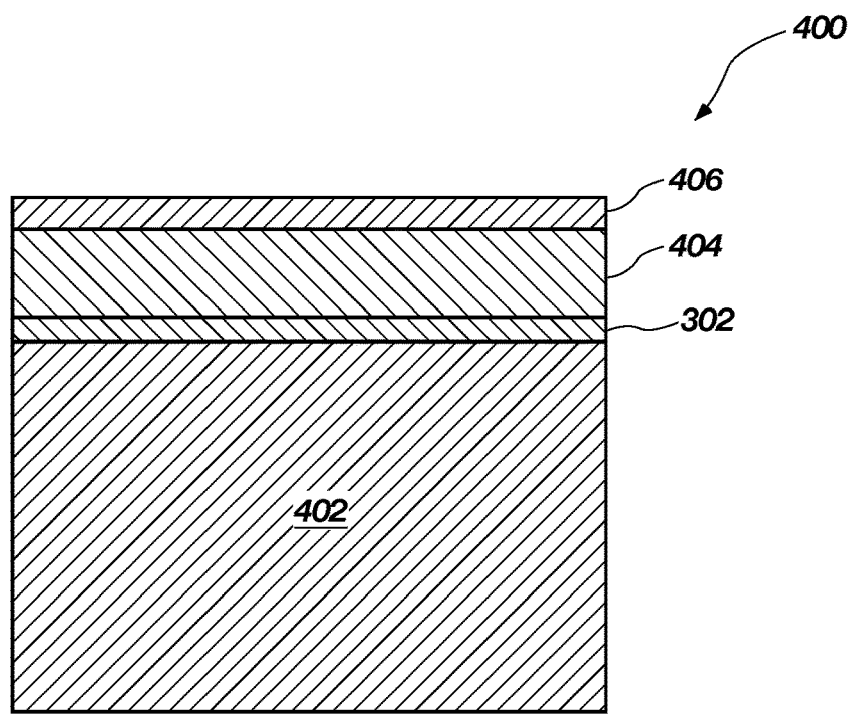
FIGS. 4A-4D are cross-sectional views illustrating different stages in various embodiments of a method for fabricating a PDC and the PDC so formed.

FIGS. 4A-4D are cross-sectional views illustrating different stages in various embodiments of a method for fabricating a PDC and the PDC so formed. According to the various embodiments described with respect to FIGS. 4A-4D, a PCD table of a PDC so formed includes one or more metallic infiltrants that replaced a metal-solvent catalyst that previously occupied and was used to form the PCD table. Referring to FIG. 4A, an assembly 400 may be formed by positioning a metallic infiltrant layer 302 between a substrate 402 and a PCD table 404, and further positioning a catalyst dump region 406 adjacent to the PCD table 404.

The PCD table 404 includes a plurality of interstitial regions that are occupied by a metal-solvent catalyst including tungsten and/or tungsten carbide due to forming the PCD table 404 by sintering diamond particles in the presence of tungsten and/or tungsten carbide. For example, the PCD table 404 may be formed by infiltrating cobalt, along with tungsten and/or tungsten carbide, from a cobalt-cemented tungsten carbide substrate into a mass of diamond particles under suitable HPHT conditions in which diamond is stable and, subsequently, removing the cobalt-cemented tungsten carbide substrate from the PCD table 404 so formed by grinding, lapping, electro-discharge machining, combinations thereof, or another suitable removal process. The PCD table 404 comprises directly bonded-together diamond grains that exhibit diamond-to-diamond bonding (e.g., $sp^3$ bonding) therebetween. The bonded-together diamond grains define interstitial regions with the metal-solvent catalyst used to promote sintering of the diamond particles disposed within the interstitial regions.

The substrate 402 may include, without limitation, cemented carbides including titanium carbide, niobium carbide, chromium carbide, tantalum carbide, vanadium carbide, or combinations of any of the preceding carbides cemented with iron, nickel, cobalt, or alloys thereof. In an embodiment, the substrate 402 may comprise a cobalt-cemented tungsten carbide material.

The dump region 406 may comprise a mass of ceramic particles. For example, the dump region 406 may comprise un-sintered silicon carbide particles, un-sintered aluminum oxide particles, or combinations thereof.

The assembly 400 may be subjected to an HPHT process using the same or similar HPHT conditions used to HPHT process the assembly 100 shown in FIG. 1A. The HPHT process liquefies the metal infiltrant layer 302, a second metallic infiltrant in the substrate 402, and the metal-solvent catalyst in the PCD table 404. During the HPHT process, a first metallic infiltrant from the first metallic infiltrant layer 302 infiltrates into the PCD table 404 and a second metallic infiltrant from the substrate 402 infiltrates into the PCD table 404 following the first metallic infiltrant. The first and second metallic infiltrants displace the metal-solvent catalyst previously occupying the interstitial regions of the PCD table 404 into the dump region 406.

Figure 4B:
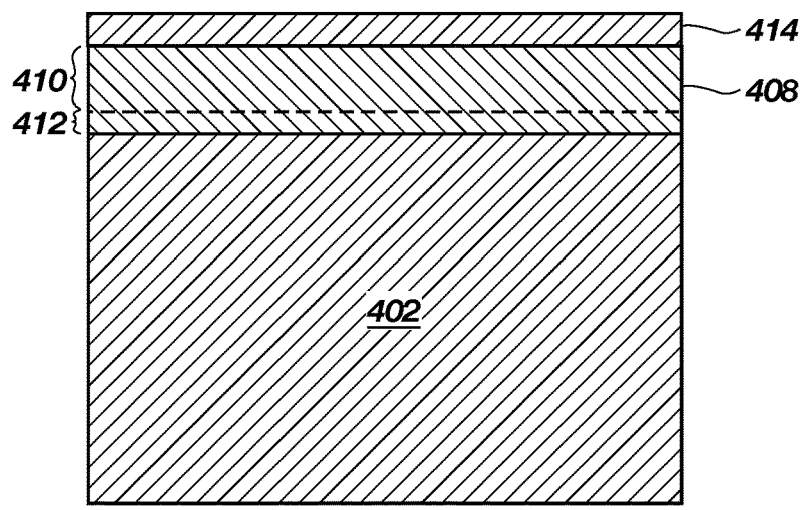

Referring to FIG. 4B, the infiltrated PCD table is represented as PCD table 408. The PCD table 408 includes a first volume 410 having a first portion of the interstitial regions thereof occupied by the first metallic infiltrant and a second volume 412 adjacent to the substrate 402 having a second portion of the interstitial regions thereof occupied by the second metallic infiltrant. When the substrate 402 comprises a cemented tungsten carbide substrate, the second metallic infiltrant may sweep-in tungsten and/or tungsten carbide when it infiltrates into the PCD table 404. The metal-solvent catalyst previously occupying the interstitial regions of the PCD table 404 may be substantially displaced into the dump region 406 along with substantially all of the tungsten and/or tungsten carbide that was previously in the PCD table 404. The dump region 406 bonded to the PCD table 408 and the ceramic particles of the dump region 406 may be bonded together with the infiltrated metal-solvent catalyst that previously occupied the interstitial regions of the PCD table 404.

Figure 4C:
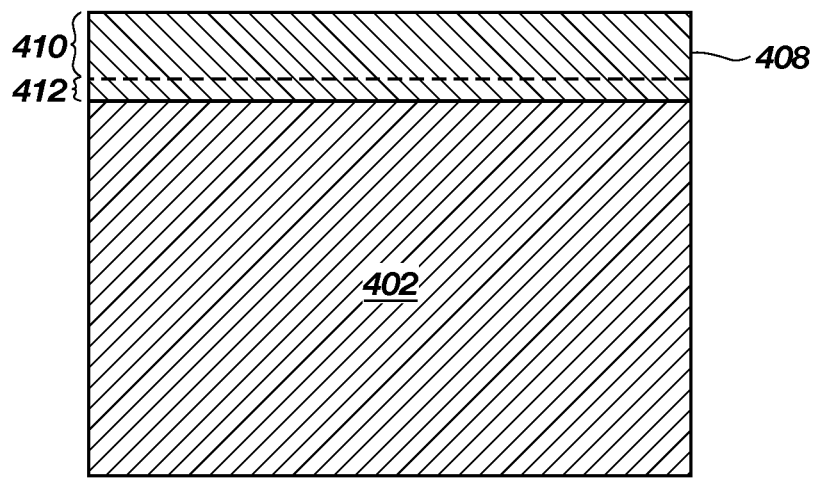

Referring to FIG. 4C, the dump region 406 may be separated from the PCD table 408 using a suitable material removal process. For example, the dump region 406 may be removed using a lapping process, a grinding process, electro-discharge machining, or combinations thereof. In some embodiments, a portion of the PCD table 408 may also be removed. For example, when not all of the metal-solvent catalyst that previously occupied the PCD table 404 is displaced into the dump region 406, some of the PCD table 408 may be removed.

Figure 4D:
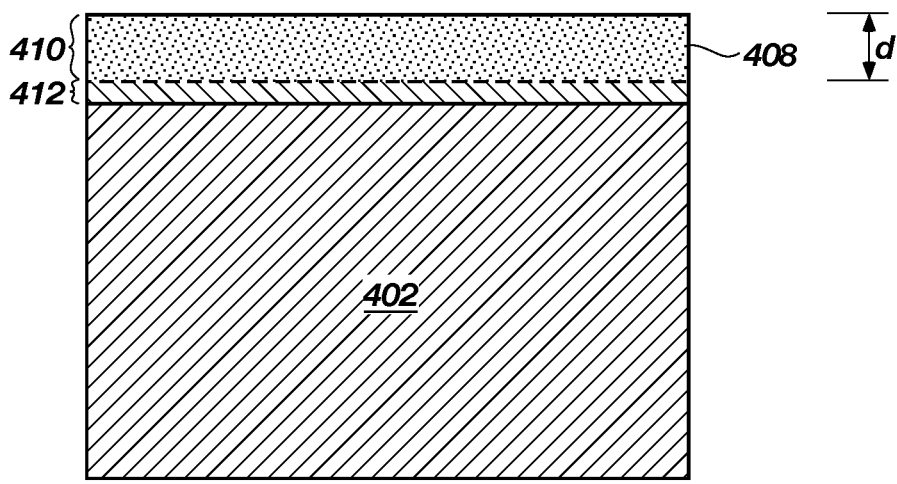

Referring to FIG. 4D, the first metallic infiltrant occupying the interstitial regions in the first volume 410 may be leached to a leach depth d from a working surface 414 of the PCD table 408. In an embodiment, the leaching process may be performed for about 2 to about 7 days to remove substantially all of the first metallic infiltrant from the first volume 410. Because the first metallic infiltrant in the first volume 410 is substantially free of tungsten and/or tungsten carbide, the leaching may be performed relatively quicker than if the at least partially leached PCD table 408 was completely infiltrated with metallic infiltrant material including tungsten and/or tungsten carbide. For example, any of the disclosed acids may be used to leach the first metallic infiltrant in the first volume 410. In an embodiment, a portion of the second metallic infiltrant from the second volume 412 may be removed in the leaching process.

In the illustrated embodiment shown in FIG. 4D, the leach depth d may extend approximately the entire thickness of the first volume 410, which may be greater than about 200 µm. In another embodiment, the leach depth d may be about 50 µm to about 500 µm. In some embodiments, the leach depth d may extend partially into the second volume 412 and a portion of the second metallic infiltrant may be removed.

In some embodiments, an infiltrant/replacement material may fill the interstitial regions of the leached first volume 410 in order to enhance wear resistance of the leached first volume 410. Any of the infiltrant/replacement materials and processes described with respect to FIGS. 1E and 1F may be employed for infiltrating the leached first volume 218.

Figure 5A:
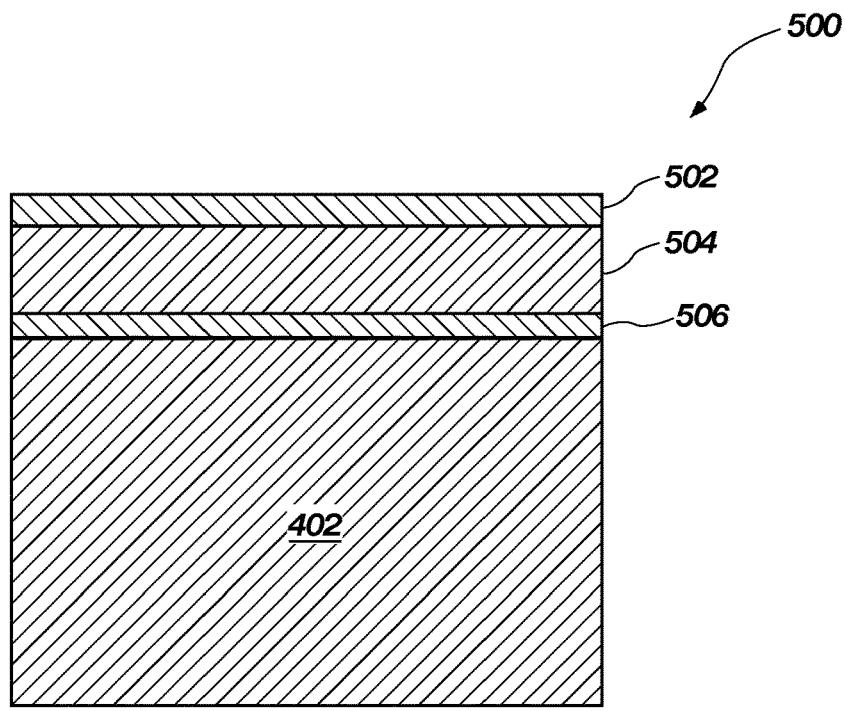
FIGS. 5A-5C are cross-sectional views illustrating different stages in various embodiments of a method for fabricating a PDC and the PDC so formed.
Figure 5B:
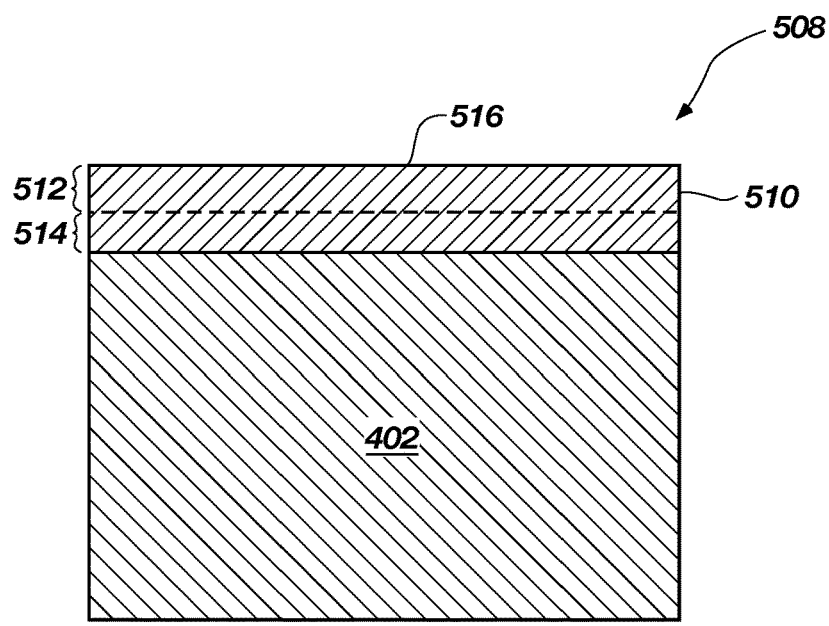
Figure 5C:
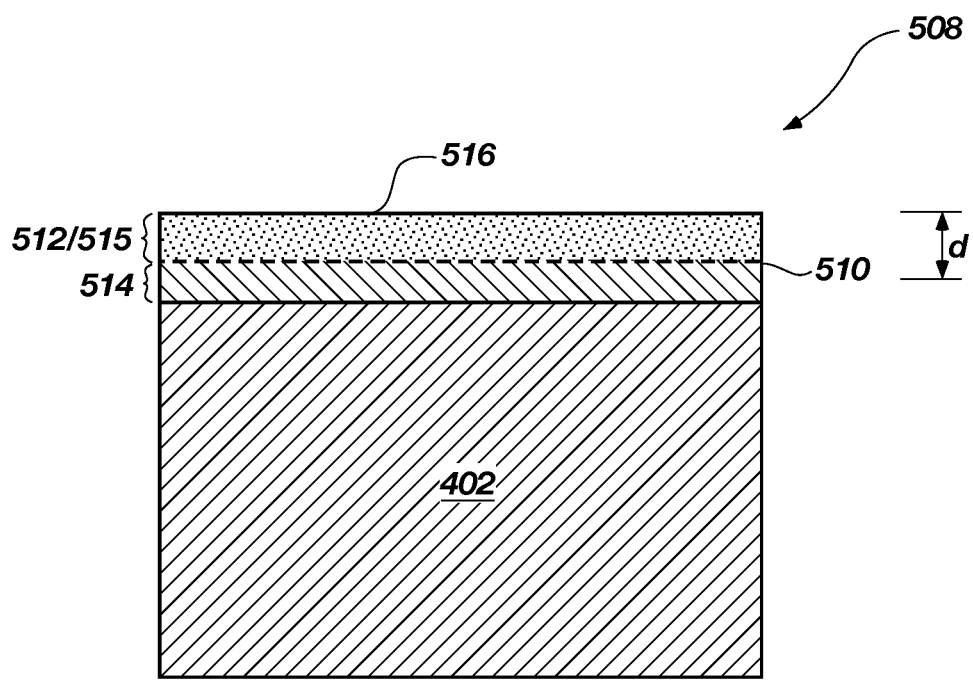

FIGS. 5A-5C are cross-sectional views illustrating different stages in various embodiments of a method for fabricating a PDC and the PDC so formed. According to the various embodiments described with respect to FIGS. 5A-5C, a PCD table of a PDC so formed may be formed using two different metal-solvent catalysts, one of which is more leachable than the other.

Referring to FIG. 5A, an assembly 500 may be formed by positioning a first metal-solvent-catalyst layer 502 between the substrate 502 and a mass of un-sintered diamond particles 504, and further positioning a second metal-solvent catalyst layer 506 adjacent to the diamond particles 504 (e.g., diamond powder). The diamond particles 504 may exhibit any of the diamond particle sizes and diamond particle size distributions disclosed herein. The first metal-solvent catalyst layer 502 comprises a first metal-solvent catalyst material and the second metal-solvent catalyst layer 506 comprises a second metal-solvent catalyst material that is less leachable than the first metal-solvent catalyst material.

In an embodiment, the first metal-solvent catalyst material may comprise a cobalt-based material (e.g., at least about 50 wt % cobalt) and the second metal-solvent catalyst material may comprise a cobalt-tungsten alloy. In an embodiment, the first metal-solvent catalyst material may comprise a cobalt-based material and the second metal-solvent catalyst material may comprise a nickel-based material (e.g., at least about 50 wt % nickel). For example, the cobalt-based material may be commercially pure cobalt and the nickel-based material may be commercially pure nickel or a nickel alloy. In yet another embodiment, the first metal-solvent catalyst material may comprise a cobalt-based material and the second metal-solvent catalyst material may comprise an iron-based material (e.g., at least about 50 wt % iron). For example, the iron-based material may be commercially pure iron or an iron alloy. In any of the various embodiments, each of the layers 502 and 506 may be in the form of a green layer of particles or a thin disc of a selected composition.

The assembly 500 may be subjected to an HPHT process using the same or similar HPHT conditions used to HPHT process the assembly 100 shown in FIG. 1A. The temperature of the HPHT process is sufficient to liquefy the first metal-solvent catalyst layer 502 and the second metal-solvent catalyst layer 506.

Referring to FIG. 5B, a PDC 508 may be formed from the first and second metal-solvent catalyst materials infiltrating into the diamond particles 504 to sinter the diamond particles 504 and catalyze formation of a PCD table 510. The PCD table 510 is bonded to the substrate 402 upon cooling from the HPHT process. The first metal-solvent catalyst material infiltrates into the diamond particles 504 to effect sintering of a first portion of the diamond particles 504 and form a first PCD volume 512 of the PCD table 510 comprising bonded-together diamond grains (e.g., $sp^3$ diamond-to-diamond bonding) defining interstitial regions, with the interstitial regions occupied by the first metal-solvent catalyst material. The second metal-solvent catalyst infiltrates into the diamond particles 504 to effect sintering of a second portion of the diamond particles 504 and form a second PCD volume 514 of the PCD table 510 comprising bonded-together diamond grains (e.g., $sp^3$ diamond-to-diamond bonding) defining interstitial regions, with the interstitial regions occupied by the second metal-solvent catalyst material. An interfacial region (not shown) may be present between the first and second PCD volumes 512 and 514. A bonding region (not shown) having an indeterminate thickness provides a strong bond (e.g., metallurgical bond) between the PCD table 510 and the substrate 402. The bonding region includes an infiltrant provided from the substrate 402 (e.g., a metal-solvent catalyst cementing constituent) that sweeps into the PCD table 510 or the diamond particles 504 following infiltration by the second metal-solvent catalyst material during the HPHT process.

In an embodiment, the second metal-solvent catalyst layer 506 may be omitted. In such an embodiment, the second metal-solvent catalyst material may be swept in from the substrate 402 during the HPHT process. For example, the substrate 402 may comprise a cobalt-cemented tungsten carbide substrate in which cobalt sweeps-in to the second portion of the diamond particles 504 carrying tungsten and/or tungsten carbide therewith and the first metal-solvent catalyst material may comprise cobalt that is substantially free of tungsten and/or tungsten carbide.

Referring to FIG. 5C, the first metal-solvent catalyst material interstitially disposed between bonded-together diamond grains in the first PCD volume 512 may be leached from the PCD table 510 to form a leached region 515 that is substantially free of the first metal-solvent catalyst material. However, even after leaching, residual amounts of the first metal-solvent catalyst material may be present in the first PCD volume 512. Such residual first metal-solvent catalyst material may be identifiable and distinguishable from the second metal-solvent catalyst material in the second PCD volume 514. The leached region 515 has a leach depth d measured from working surface 516 so that substantially all of the first metal-solvent catalyst material is removed. In the illustrated embodiment shown in FIG. 5C, the leach depth d may extend approximately the entire thickness of the first PCD volume 512, which may be greater than about 200 µm. In another embodiment, the leach depth d may be about 50 µm to about 500 µm. In some embodiments, the leach depth d may extend partially into the second PCD volume 514 and a portion of the second metal-solvent catalyst may be removed.

In some embodiments, an infiltrant/replacement material may fill the interstitial regions of the leached first PCD volume 512 in order to enhance wear resistance of the leached first volume 410. Any of the infiltrant/replacement materials, reaction products, and processes described with respect to FIGS. 1E and 1F may be employed for infiltrating the leached first PCD volume 512.

The disclosed PDC embodiments may be used in a number of different applications including, but not limited to, use in a rotary drill bit (FIGS. 6 and 7), a thrust-bearing apparatus, a radial bearing apparatus, a subterranean drilling system, and a wire-drawing die, an artificial joint, a machining element, and a heat sink. It should be emphasized that the various applications discussed above are merely some examples of applications in which the PDC embodiments may be used. Other applications are contemplated, such as employing the disclosed PDC embodiments in friction stir welding tools.

Figure 6:
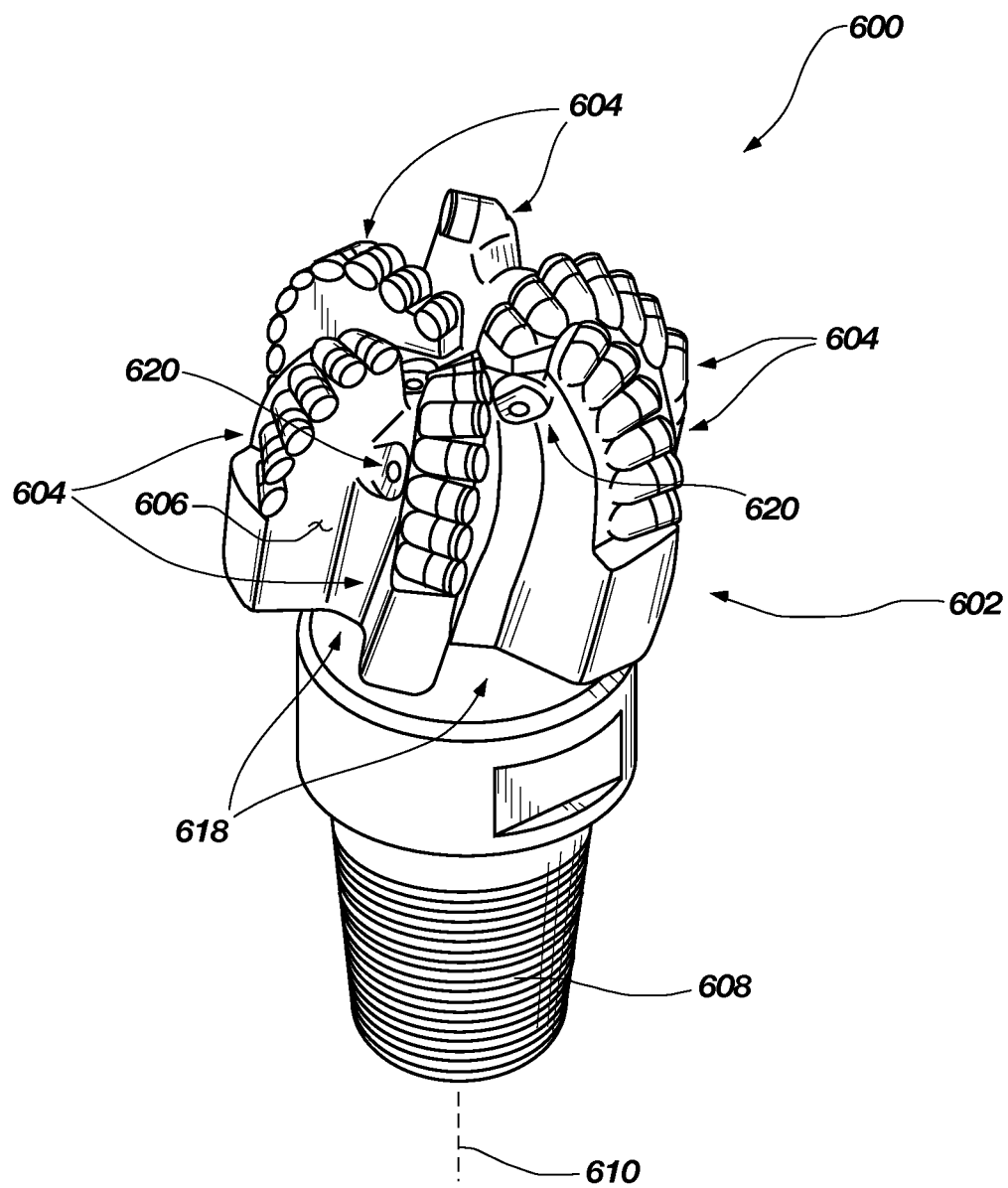
FIG. 6 is an isometric view of an embodiment of a rotary drill bit that may employ one or more of the disclosed PDC embodiments.
Figure 7:
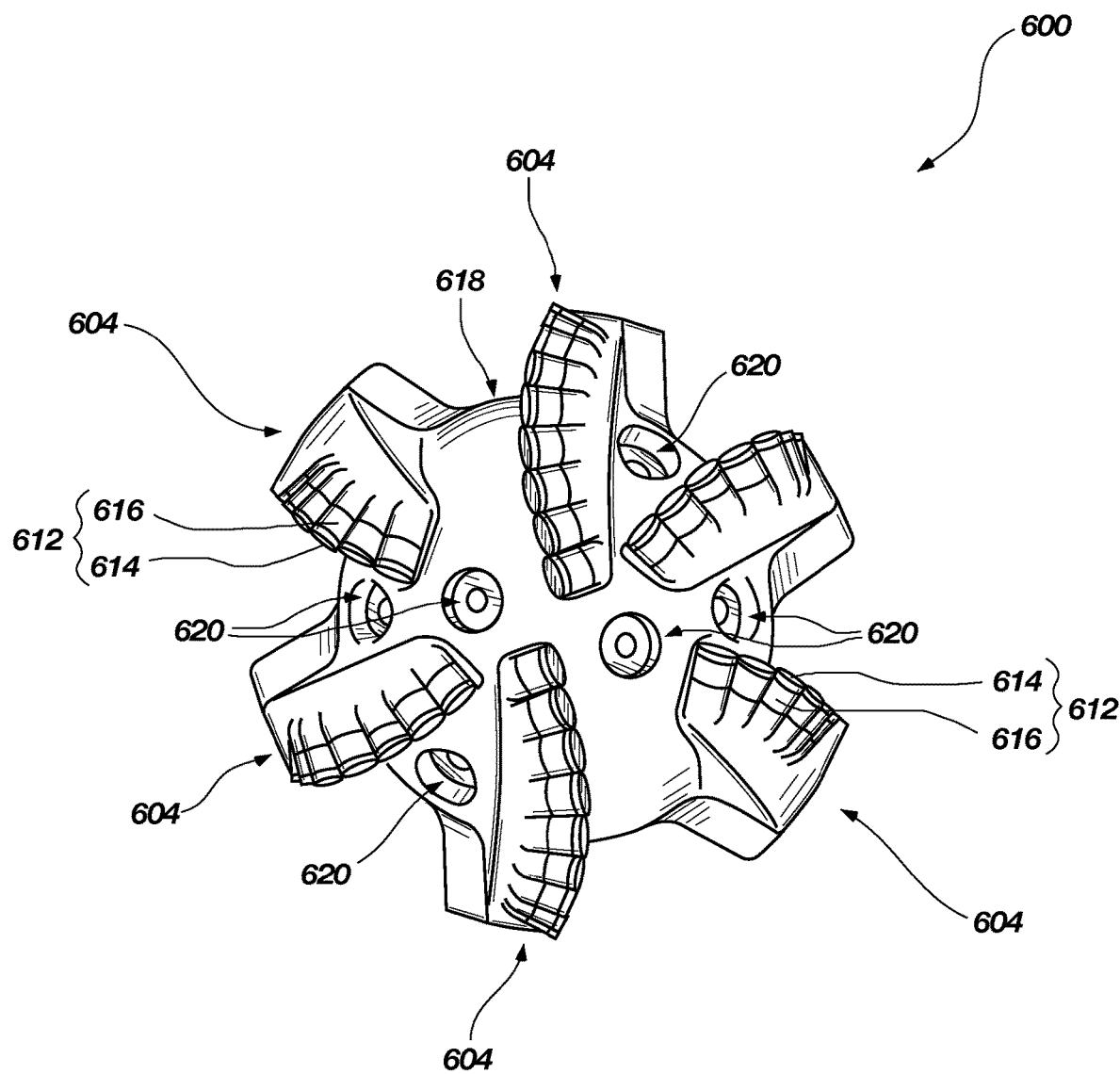
FIG. 7 is a top elevation view of the rotary drill bit shown in FIG. 6.

FIG. 6 is an isometric view and FIG. 7 is a top elevation view of an embodiment of a rotary drill bit 600. The rotary drill bit 600 includes at least one PDC configured according to any of the previously described PDC embodiments. The rotary drill bit 600 comprises a bit body 602 that includes radially and longitudinally extending blades 604 with leading faces 606, and a threaded pin connection 608 for connecting the bit body 602 to a drilling string. The bit body 602 defines a leading end structure for drilling into a subterranean formation by rotation about a longitudinal axis 610 and application of weight-on-bit. At least one PDC cutting element, configured according to any of the previously described PDC embodiments (e.g., the PDC shown in FIG. 1D), may be affixed to the bit body 602. With reference to FIG. 6, a plurality of PDCs 612 are secured to the blades 604. For example, each PDC 612 may include a PCD table 614 bonded to a substrate 616. More generally, the PDCs 612 may comprise any PDC disclosed herein, without limitation. In addition, if desired, in some embodiments, a number of the PDCs 612 may be conventional in construction. Also, circumferentially adjacent blades 604 define so-called junk slots 618 therebetween, as known in the art. Additionally, the rotary drill bit 600 may include a plurality of nozzle cavities 620 for communicating drilling fluid from the interior of the rotary drill bit 600 to the PDCs 612.

FIGS. 6 and 7 merely depict one embodiment of a rotary drill bit that employs at least one cutting element that comprises a PDC fabricated and structured in accordance with the disclosed embodiments, without limitation. The rotary drill bit 600 is used to represent any number of earth-boring tools or drilling tools, including, for example, core bits, roller-cone bits, fixed-cutter bits, eccentric bits, bicenter bits, reamers, reamer wings, or any other downhole tool including PDCs, without limitation.

The PDCs disclosed herein may also be utilized in applications other than cutting technology. For example, the disclosed PDC embodiments may be used in wire dies, bearings, artificial joints, inserts, cutting elements, and heat sinks. Thus, any of the PDCs disclosed herein may be employed in an article of manufacture including at least one superabrasive element or compact.

Thus, the embodiments of PDCs disclosed herein may be used in any apparatus or structure in which at least one conventional PDC is typically used. In one embodiment, a rotor and a stator, assembled to form a thrust-bearing apparatus, may each include one or more PDCs configured according to any of the embodiments disclosed herein and may be operably assembled to a downhole drilling assembly. U.S. Pat. Nos. 4,410,054; 4,560,014; 5,364,192; 5,368,398; and 5,480,233, the disclosure of each of which is incorporated herein, in its entirety, by this reference, disclose subterranean drilling systems within which bearing apparatuses utilizing superabrasive compacts disclosed herein may be incorporated. The embodiments of non-cylindrical PDCs disclosed herein may also form all or part of heat sinks, wire dies, bearing elements, cutting elements, cutting inserts (e.g., on a roller-cone-type drill bit), machining inserts, or any other article of manufacture as known in the art. Other examples of articles of manufacture that may use any of the non-cylindrical PDCs disclosed herein are disclosed in U.S. Pat. Nos. 4,811,801; 4,274,900; 4,268,276; 4,468,138; 4,738,322; 4,913,247; 5,016,718; 5,092,687; 5,120,327; 5,135,061; 5,154,245; 5,180,022; 5,460,233; 5,544,713; and 6,793,681, the disclosure of each of which is incorporated herein, in its entirety, by this reference.

The following working examples provide further detail in connection with some of the specific embodiments described above.

COMPARATIVE WORKING EXAMPLE 1

Two hundred leached PCD tables were formed according to the following process. A mixture of diamond particles having an average particle size of about 19 µm was placed adjacent to a cobalt-cemented tungsten carbide substrate. The mixture and substrate were positioned within a pyrophyllite cube, and HPHT processed at a temperature of about 1400° C. and a pressure of about 5 GPa to about 7 GPa in a high-pressure cubic press to form a PCD table. The substrate was removed from the PCD table so formed after HPHT processing by grinding. The separated PCD table was immersed in a mixture of hydrofluoric and nitric acid to leach the cobalt therefrom. The amount of cobalt remaining in the leached PCD table was determined using coercivity measurements made with a KOERZIMAT CS 1.096 instrument. The minimum amount of cobalt remaining in the leached PCD disks was 0.8720 wt %.

WORKING EXAMPLE 2

Two hundred leached PCD tables were formed according to the following process. A mixture of diamond particles having an average particle size of about 19 µm and tungsten particles was formed. The tungsten particles were about 2 wt % of the mixture. The mixture was placed adjacent to a cobalt-cemented tungsten carbide substrate. The mixture and substrate positioned within a pyrophyllite cube, and HPHT processed at a temperature of about 1400° C. and a pressure of about 5 GPa to about 7 GPa in a high-pressure cubic press to form a PCD table. The substrate was removed from the PCD table so formed after HPHT processing by grinding. The separated PCD table was immersed in a mixture of hydrofluoric and nitric acid to leach the cobalt therefrom. The amount of cobalt remaining in the leached PCD table was determined using coercivity measurements made with a KOERZIMAT CS 1.096 instrument. The minimum amount of cobalt remaining in the leached PCD disks was 0.7381 wt %. Thus, the use of tungsten particles in Working Example 2 was found to promote leaching the infiltrated cobalt in the PCD tables compared to Comparative Working Example 1.

While various aspects and embodiments have been disclosed herein, other aspects and embodiments are contemplated. The various aspects and embodiments disclosed herein are for purposes of illustration and are not intended to be limiting. Additionally, the words "including," "having," and variants thereof (e.g., "includes" and "has") as used herein, including the claims, shall have the same meaning as the word "comprising" and variants thereof (e.g., "comprise" and "comprises").

What is claimed is:
1. A subterranean drill bit, comprising:
a bit body; and
a plurality of polycrystalline diamond compacts affixed to the bit body, at least one of the plurality of polycrystalline diamond compacts, including:
a substrate including cemented carbide; and
a polycrystalline diamond table including a working surface and an opposing interfacial surface bonded to the substrate, the polycrystalline diamond table including bonded diamond grains defining a plurality of interstitial regions, the polycrystalline diamond table further including:
a first volume extending inwardly from the working surface;
a second volume extending inwardly from the interfacial surface;
a metal-solvent catalyst material disposed in at least a portion of the plurality of interstitial regions;
at least one sacrificial material disposed in at least a portion of the plurality of interstitial regions, wherein the at least one sacrificial material includes a material separate from and different than that of the metal-solvent catalyst material;
wherein an average particle size of the at least one sacrificial material is about 10 nm to about 10 µm;
wherein the at least one sacrificial material is present in the first volume and the second volume in a pre-leaching concentration of greater than 0 weight % to about 5 weight % of the first volume and the second volume;
wherein the first volume exhibits a concentration of the metal-solvent catalyst material of less than 0.85 weight % of the first volume after leaching the first volume; and
wherein the second volume includes the pre-leaching concentration of the at least one sacrificial material, after leaching the first volume.

2. The subterranean drill bit of claim 1 wherein the concentration of the metal-solvent catalyst material in the first volume is about 0.20 weight % to about 0.50 weight % of the first volume after leaching.

3. The subterranean drill bit of claim 1 wherein the concentration of the metal-solvent catalyst material of the first volume is about 0.50 weight % to about 0.78 weight % of the first volume after leaching.

4. The subterranean drill bit of claim 1 wherein the metal-solvent catalyst material includes at least one of iron, nickel, or cobalt.

5. The subterranean drill bit of claim 1 wherein the at least one sacrificial material includes tungsten carbide.

6. The subterranean drill bit of claim 1 wherein the first volume extends to a depth of about 50 µm to about 500 µm from the working surface.

7. The subterranean drill bit of claim 1 wherein the first volume extends to a depth of at least about 200 µm from the working surface.

8. The subterranean drill bit of claim 1 wherein:
the at least one sacrificial material includes a plurality of sacrificial particles, at least one reaction product of the plurality of diamond grains and the plurality of sacrificial particles, or combinations thereof.

9. A rotary drill bit, comprising:
a bit body, the bit body including a plurality of pockets; and
a plurality of polycrystalline diamond compacts affixed to the bit body in the plurality of pockets, at least one of the plurality of polycrystalline diamond compacts, including:
a substrate including cemented carbide; and
a polycrystalline diamond table including a working surface and an opposing interfacial surface bonded to the substrate, the polycrystalline diamond table including bonded diamond grains defining a plurality of interstitial regions, the polycrystalline diamond table further including:
a first volume extending inwardly from the working surface;
a second volume extending inwardly from the interfacial surface;
a metal-solvent catalyst material disposed in at least a portion of the plurality of interstitial regions;
at least one sacrificial material disposed in at least a portion of the plurality of interstitial regions, wherein the at least one sacrificial material includes a material separate from and different than that of the metal-solvent catalyst material;

wherein an average particle size of the at least one sacrificial material is about 10 nm to about 10 µm;

wherein the at least one sacrificial material is present in the first volume and the second volume in a pre-leaching concentration of greater than 0 weight % to about 5 weight % of the first volume and the second volume;

wherein the first volume exhibits a concentration of the metal-solvent catalyst material of less than 0.85 weight % of the first volume after leaching the first volume; and wherein the second volume includes the pre-leaching concentration of the at least one sacrificial material after leaching the first volume.

10. The rotary drill bit of claim 9 wherein the metal-solvent catalyst material includes at least one of iron, nickel, or cobalt.

11. The rotary drill bit of claim 9 wherein the at least one sacrificial material includes tungsten carbide.

12. The rotary drill bit of claim 9 wherein the first volume extends to a depth of at least about 200 µm from the working surface.

13. The rotary drill bit of claim 9 further comprising a braze material affixing at least some of the plurality of polycrystalline diamond compacts to the bit body.

14. A rotary drill bit, comprising:
a bit body, the bit body including a plurality of pockets; and
a plurality of polycrystalline diamond compacts each of which is affixed to the bit body in a corresponding one of the plurality of pockets, at least one of the plurality of polycrystalline diamond compacts, including:
a substrate including cemented carbide; and
a polycrystalline diamond table including a working surface and an opposing interfacial surface directly bonded to the substrate, the polycrystalline diamond table including bonded diamond grains defining a plurality of interstitial regions, the polycrystalline diamond table further including:
a first volume of the polycrystalline diamond table including the bonded diamond grains extending inwardly from the working surface;
a second volume of the polycrystalline diamond table including the bonded diamond grains extending inwardly from the interfacial surface;
a metal-solvent catalyst material disposed in at least a portion of the plurality of interstitial regions, wherein the metal-solvent catalyst material includes at least one of iron, nickel, or cobalt;
at least one sacrificial material disposed in at least a portion of the plurality of interstitial regions, wherein the at least one sacrificial material includes a material separate from and different than that of the metal-solvent catalyst material, the at least one sacrificial material including a plurality of sacrificial particles, at least one reaction product of the plurality of diamond grains and the plurality of sacrificial particles, or combinations thereof;

wherein an average particle size of the at least one sacrificial material is about 10 nm to about 10 µm;

wherein the at least one sacrificial material is present in the first volume and the second volume of the polycrystalline diamond table in a pre-leaching concentration of greater than 0 weight % to about 5 weight % of the first volume and the second volume prior to leaching the first volume;

wherein the first volume exhibits a post-leaching concentration of the metal-solvent catalyst material of less than 0.85 weight % of the first volume; and wherein the second volume includes the pre-leaching concentration of the at least one sacrificial material, after leaching the first volume.

15. The rotary drill bit of claim 14 wherein the at least one sacrificial material includes tungsten carbide.

16. The rotary drill bit of claim 14 wherein the concentration of the metal-solvent catalyst material of the first volume is about 0.20 wt % to about 0.75 wt % of the first volume after leaching.

17. The rotary drill bit of claim 14 wherein the first volume extends to a depth of about 50 µm to about 500 µm from the working surface.

18. The rotary drill bit of claim 14 wherein the first volume extends to a depth of at least about 200 µm from the working surface.

19. The rotary drill bit of claim 14 further comprising a braze material affixing at least some of the plurality of polycrystalline diamond compacts to the bit body.

20. The subterranean drill bit of claim 1 wherein the at least one sacrificial material includes a ceramic.

21. The subterranean drill bit of claim 1 wherein the at least one sacrificial material includes tungsten.

22. The subterranean drill bit of claim 1 wherein the at least one sacrificial material is present in the first volume and the second volume in a pre-leaching concentration of about 1 weight % to about 5 weight % of the first volume and the second volume.

* * * * *